United States Patent
Mara

(10) Patent No.: US 12,406,206 B2
(45) Date of Patent: Sep. 2, 2025

(54) APPARATUS AND METHOD FOR INTEGRATING A PLURALITY OF PROXIMATE PROVIDER DATA STRUCTURES IN A DIGITAL ENVIRONMENT

(71) Applicant: Maranet, Inc, Erin (CA)

(72) Inventor: Patti Mara, Erin (CA)

(73) Assignee: Maranet Inc., Guelph (CA)

( * ) Notice: Subject to any disclaimer, the term of this patent is extended or adjusted under 35 U.S.C. 154(b) by 0 days.

(21) Appl. No.: 18/227,572

(22) Filed: Jul. 28, 2023

(65) Prior Publication Data

US 2025/0037008 A1 Jan. 30, 2025

(51) Int. Cl.
*G06N 20/00* (2019.01)
*G06F 16/20* (2019.01)
*G06Q 30/0204* (2023.01)

(52) U.S. Cl.
CPC .......... *G06N 20/00* (2019.01); *G06F 16/20* (2019.01); *G06Q 30/0205* (2013.01)

(58) Field of Classification Search
CPC ..... G06N 20/00; G06F 16/20; G06Q 30/0205
See application file for complete search history.

(56) References Cited

U.S. PATENT DOCUMENTS

| 10,853,780 | B1 * | 12/2020 | Sirota | G06Q 10/06 |
| 10,885,561 | B2 | 1/2021 | Psota | |
| 11,663,675 | B1 * | 5/2023 | Estes | G08G 1/09 705/4 |
| 2012/0116868 | A1 * | 5/2012 | Chin | G06Q 30/0244 705/14.43 |
| 2014/0074554 | A1 * | 3/2014 | Warner | G06Q 30/0205 705/7.34 |
| 2020/0005367 | A1 | 1/2020 | Christian-Ezeofor | |
| 2020/0104807 | A1 | 4/2020 | Leblanc | |
| 2023/0325727 | A1 * | 10/2023 | Wang | G06N 20/20 706/12 |

\* cited by examiner

*Primary Examiner* — Albert M Phillips, III
(74) *Attorney, Agent, or Firm* — Caldwell Intellectual Property Law

(57) ABSTRACT

An apparatus for integrating a plurality of proximate provider data structures in a digital environment, the apparatus includes a processor and a memory containing instructions configuring the processor to receive provider data from first entities, wherein provider data includes provider indicators associated with first entities, generate provider models in a digital environment by creating provider data structures based on provider data, identifying proximate provider data structures according to the provider indicators, and generating at least one provider model by integrating proximate provider data structures, operate a digital communication between the provider model and a user model from a second entity, wherein operating the digital communication includes detect an action datum and execute the action datum based on the user model, and generate a provider landscape as a function of the execution of the action datum.

20 Claims, 9 Drawing Sheets

APPARATUS AND METHOD FOR INTEGRATING A PLURALITY OF PROXIMATE PROVIDER DATA STRUCTURES IN A DIGITAL ENVIRONMENT

FIELD OF THE INVENTION

The present invention generally relates to the field of online shopping. In particular, the present invention is directed to apparatus and method for integrating a plurality of proximate provider data structure in a digital environment.

BACKGROUND

Conventional systems fail to offer a unified and seamless user experience that bridges various provider platforms with diverse geographic locations and operators. There is a need for an advanced digital solution that not only integrates information from plurality of disparate providers but also facilities direct transactional capabilities, thereby enhancing the visibility and competitiveness of local provider in the digital environment.

SUMMARY OF THE DISCLOSURE

In an aspect, an apparatus for integrating a plurality of proximate provider data structures in a digital environment is described. The apparatus includes at least a processor and a memory communicatively connected to the at least a processor, wherein the memory contains instructions configuring the at least a processor to receive provider data from a plurality of first entities, wherein provider data includes a plurality of provider indicators associated with the plurality of first entities, generate a plurality of provider models in a digital environment, wherein generating the plurality of provider models includes creating a plurality of provider data structures as a function of provider data, wherein each provider data structure of the plurality of provider data structures is associated with at least one first entity of the plurality of first entities, identifying a plurality of proximate provider data structures as a function of the plurality of provider indicators using a provider data structure classifier, and generating at least one provider model by integrating the plurality of proximate provider data structures, operate a digital communication between the at least one provider model and a user model modeled using user data from a second entity in the digital environment, wherein operating the digital communication includes detect an action datum targeting at least one proximate provider data structure of the at least one provider model from the second entity and execute the action datum as a function the user data, and generate a provider landscape as a function of the execution of the action datum.

In another aspect, a method for integrating a plurality of proximate provider data structures in a digital environment is described. The method includes receiving, by at least a processor, provider data from a plurality of first entities, wherein provider data includes a plurality of provider indicators associated with the plurality of first entities, generating, by the at least a processor, a plurality of provider models in a digital environment, wherein generating the plurality of provider models includes creating a plurality of provider data structures as a function of the provider data, wherein each provider data structure of the plurality of provider data structures is associated with at least one first entity of the plurality of first entities, identifying a plurality of proximate provider data structures as a function of the plurality of provider indicators using a provider data structure classifier, and generating at least one provider model by integrating the plurality of proximate provider data structures, operating, by the at least a processor, a digital communication between the at least one provider model and a user model modeled using user data from a second entity in the digital environment, wherein operating the digital communication includes detecting an action datum targeting at least one proximate provider data structure of the at least one provider model from the second entity and executing the action datum as a function the user data, and generating, by the at least a processor, a provider landscape as a function of the execution of the action datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
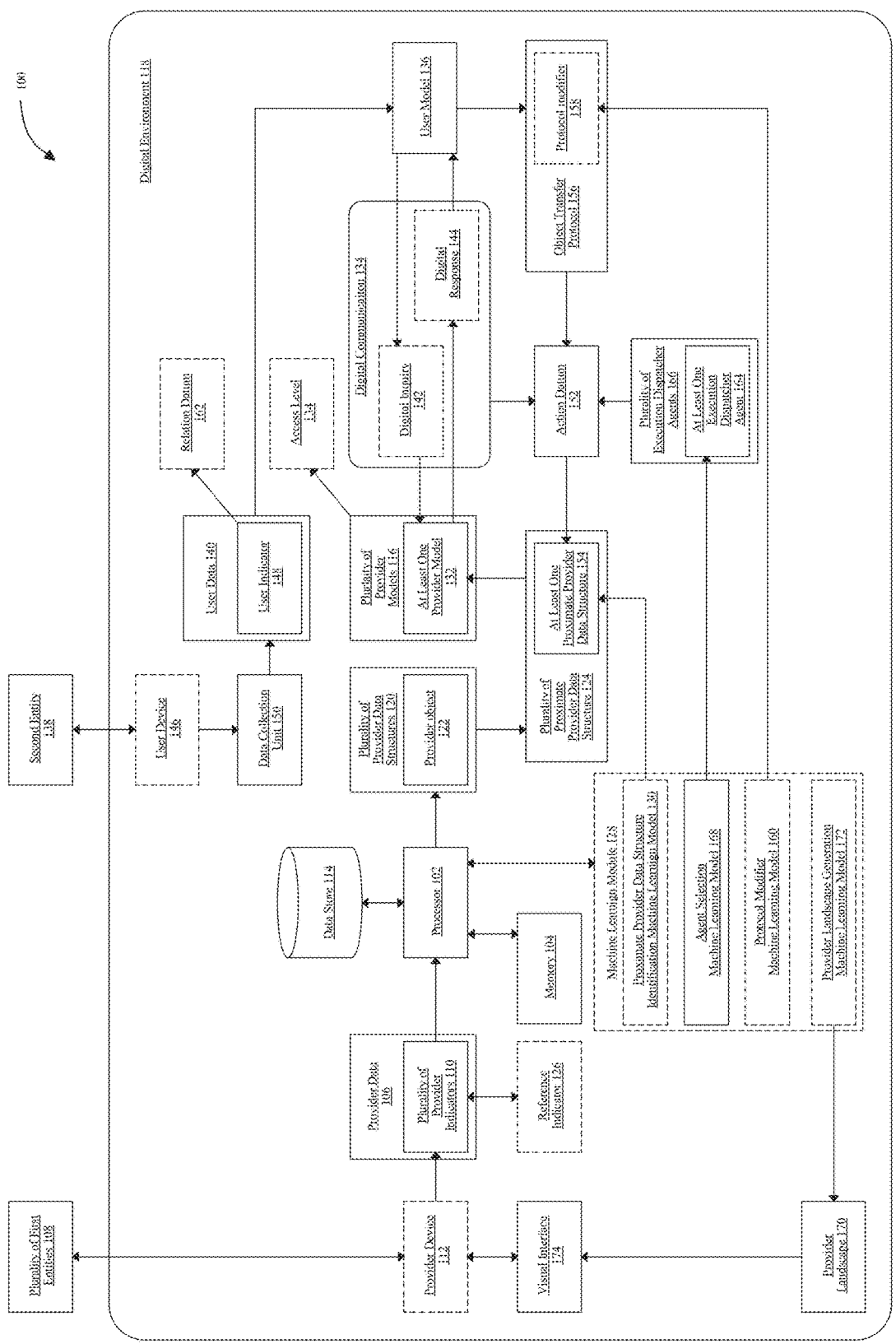
FIG. 1 is a block diagram of an exemplary embodiment of apparatus for integrating a plurality of proximate provider data structures in a digital environment.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for integrating a plurality of proximate provider data structures in a digital environment. The apparatus includes at least a processor and a memory containing instructions configuring the at least a processor to receive provider data from a plurality of first entities, wherein provider data includes a plurality of provider indicators associated with the plurality of first entities, generate a plurality of provider models in a digital environment, wherein generating the plurality of provider models includes creating a plurality of provider data structures as a function of provider data, wherein each provider data structure of the plurality of provider data structures is associated with at least one first entity of the plurality of first entities, identifying a plurality of proximate provider data structures as a function of the plurality of provider indicators using a provider data structure classifier, and modeling at least one provider model by integrating the plurality of proximate provider data structures, operate a digital communication between the at least one provider model and a user model modeled using user data from a second entity in the digital environment, wherein operating the digital communication includes detect an action datum targeting at least one proximate provider data structure of the at least one provider model from the second entity and execute the action datum as a function the user data, and generate a provider landscape as a function of the execution of the action datum. Exemplary embodiments illustrating aspects of the present disclosure are described below in the context of several specific examples.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

A "digital signature," as used herein, includes a secure proof of possession of a secret by a signing device, as performed on provided element of data, known as a "message." A message May include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus 100 for integrating a plurality of proximate provider data structures in a digital environment is illustrated. System includes a processor 102. Processor 102 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 102 may include a single computing device operating independently, or may include two or more computing device operating in concert, in parallel, sequentially or the like; two or more computing devices may be included together in a single computing device or in two or more computing devices. Processor 102 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Processor 102 may include one or more computing devices dedicated to data storage, security, distribution of traffic for load balancing, and the like. Processor 102 may distribute one or more computing tasks as described below across a plurality of computing devices of computing device, which may operate in parallel, in series, redundantly, or in any other manner used for distribution of tasks or memory between computing devices. Processor 102 may be implemented using a "shared nothing" architecture in which data is cached at the worker, in an embodiment, this may enable scalability of system 100 and/or computing device.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, an apparatus 100 includes a memory 104 communicatively connected to at least a processor 102. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting May also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, apparatus 100 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, apparatus 100 is configured to receive provider data 106 from a plurality of first entities 108. As used in this disclosure, "provider data" are information related to plurality of first entities 108, wherein each "first entity" of plurality of first entities is an independent and distinct existence such as a legal person that provide a product and/or service. For a non-limiting example, first entity may include an individual or a group of individuals that offers goods in exchange for payment, such as, without limitation, one or more marketplace sellers, vendors, suppliers, retailers and/or the like. In some cases, provider data 106 may include identification and contact data of one or more first entities, for example, and without limitation, name, phone number, email address, any other data that is essential for communication and for establishing the identity of one or more first entities. In some cases, provider data 106 may also include operational data, for example, and without limitation, hours of operation, capacity for providing goods/services, inventory level, staffing level, and/or the like. In other cases, provider data 106 may further include performance data, e.g., customer reviews, ratings, feedbacks, completion rates, return rates, and/or the like.

In another non-limiting example, and still referring to FIG. 1, plurality of first entities 108 may include one or more providers e.g., service providers. Service providers may include, without limitation, information technology (IT) service providers, telecommunication service providers, healthcare service providers, financial service providers, transportation service providers, legal service providers, educational service providers, hospitality service providers, consulting service providers, cleaning service providers, personal care providers, hone repair service providers, advertising service providers, event planning service providers, catering service providers, fitness service providers, pet care service providers, photography and videography service providers, translation service providers, real estate service providers, occupational service providers, and any service providers thereof. In some cases, plurality of first entities 108 may include one or more service providers providing the same type of service. In other cases, plurality of first entities 108 may include one or more service providers providing different types of service. Additionally, a first entity (i.e., a first service provider) that provides a first type of service, may interact with another first entity (i.e., a second service provider) that provides a second type of service. For example, and without limitation, a customer support platform where a software company (i.e., first service provider) provides technical support services to a plurality of customers; however, for specific hardware-related issues, the software company may need to collaborate with a hardware manufacture (i.e., second service provider) to address those concerns. Additionally, or alternatively, plurality of first entities 108 may include legal person such as, without limitation, government, e.g., municipality, state government, provincial government, departmental government, national or federal government, quasi-governmental organization, and/or the like thereof. In some embodiments, each first entity of plurality of first entities 108 may include one or more sub-entities such as, without limitation, departments or divisions of entities described above.

With continued reference to FIG. 1, provider data 106 includes a plurality of provider indicators 110 associated with plurality of first entities 108. In some cases, each provider indicator of plurality of provider indicators 110 may be associated with only one first entity. In other cases, each provider indicator of plurality of provider indicators 110 may be associated with more than one first entities. As used in this disclosure, "provider indicators" are specific data points that can be used to identify or characterize a first entity (e.g., any provider as listed above in this disclosure). In an embodiment, plurality of provider indicators 110 may include a plurality of geographic indicators, wherein "geographic indicators," as described herein, are indicators that relate to the physical location of first entity. In some cases, each geographic indicator of plurality of geographic indicators may associate with one or more first entities. In a non-limiting example, plurality of provider indicators 110 may include provider addresses, wherein each provider address may include a name and number of street, a name and/or number of a building, city, state, country and zone improvement plan (zip) code. For example, and without limitation, provider indicator associated with a provider located in the Empire State Building may include a provider addresses of "20 W 34th St., New York, NY 10001." In some cases, geographic indicators may include global positioning system (GPS) coordinates (i.e., a unique identifier of a precise geographic location on the earth). Continuing with the non-limiting example, provider indicator associated with the provider (located in the Empire State Building) may include a GPS coordinate: "N40° 44.9064', W073° 59.0735".

Still referring to FIG. 1, other exemplary provider indicators 110 may include, without limitation, industry/sector indicators (i.e., industry or sector in which plurality of first entities 108 operate, e.g., Standard Industrial Classification SIC codes, North American Industry Classification System NAICS codes, or similar systems), size indicators (i.e., information about the size of plurality of first entities 108, e.g., number of employees, annual revenue, market share, and/or the like), legal/regulatory indicators (i.e., indicators related to the legal or regulatory status of plurality of first entities 108, e.g., business registration number, tax identification numbers, or any licensing information), performance indicators (i.e., indicators related to the performance of plurality of first entities 108, e.g., customer satisfaction ratings, delivery times, return rates, or any other performance metrics), and/or operational indicators (i.e., indicators related to operations of plurality of first entities 108, e.g., hours of operation, capacity for providing goods/services, inventory levels, and/or the like). Additionally, or alternatively, plurality of provider indicators 110 may include a plurality of combinations of different provider indicators listed. For instance, and without limitation, processor 102 may be configured to generate a combined provider indicator as a function of one or more provider indicators listed above by concatenating and/or encrypting/hashing using one or more provider indicators. Persons of ordinary skill in the art, after viewing the entirety of this disclosure, would appreciate the various provider indicators that can be used by processor 104 to identify plurality of first entities 108.

In one or more embodiments, and still referring to FIG. 1, each provider indicator of plurality of provider indicators 110 may be present as a vector. As used in this disclosure, a "vector" is a data structure that represents one or more quantitative values and/or measures of provider data that may be used by processor 102 for first entity identification and/or characterization. In some cases, a vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes.

With continued reference to FIG. 1, in some cases, provider data 106 may be received from a provider device 112. A "provider device," for the purpose of this disclosure, is any additional computing device used by first entity to access and/or interact with processor 102, such as a mobile device, laptop, desktop computer, or the like. In a non-limiting embodiment, provider device 112 may be a computer and/or smart phone operated by first entity in a remote location. Provider device 112 may include, without limitation, a display; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, provider device 112 may include a graphical user interface (GUI) configured to display any information from apparatus 100 such as a visual interface as described in further detail below. Provider device 112 may further include any device that is capable of transmitting information either wirelessly or through wired communication to another device such as processor 102. In a non-limiting example, provider data 106 may be input into provider device 112 by a first entity. Provider device 112 may transmit provider data 120 to processor 102 across a wireless connection. Additionally, or alternatively, provider device 112 may include a shared provider device, wherein the shared provider device is a device that is designed for use by more than one first entity simultaneously or otherwise sequentially. In a non-limiting example, a shared device may include a public computing device such as a kiosk.

Still referring to FIG. 1, in some cases, processor 102 may be communicatively connected with a data store 114, wherein receiving provider data 106 may include retrieving provider data 106 from the data store 114. As used in this disclosure, "data store" is a device configured to store data such as provider data 106 and/or any data described this disclosure. In a non-limiting example, data store 116 may include a database. Data store 114 may be implemented, without limitation, as a relational database, a key-value retrieval database such as a NOSQL database, or any other format or structure for use as a database that a person skilled in the art would recognize as suitable upon review of the entirety of this disclosure. Data store 114 may alternatively or additionally be implemented using a distributed data storage protocol and/or data structure, such as a distributed hash table or the like. Data store 114 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in data store may store, retrieve, organize, and/or reflect data and/or records as used herein, as well as categories and/or populations of data consistently with this disclosure.

Additionally, or alternatively, and still referring to FIG. 1, provider data 106 may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, at least a processor 102 may generate a web crawler to scrape provider data 106 from website related to plurality of first entities 108 such as, without limitation, provider's service website, social media sites, blogs, or forums. In some embodiments, the web crawler may be trained with information received from plurality of first entities 108 through a user interface. In some embodiments, the web crawler may be configured to generate a web query. A web query may include search criteria received from plurality of first entities 108. For example, and without limitation, plurality of first entities 108 may submit a plurality of websites for the web crawler to search provider data 106. Additionally, the web crawler function may be configured to search for and/or detect one or more data patterns. A "data pattern" as used in this disclosure is any repeating forms of information. In some embodiments, the web crawler may be configured to determine the relevancy of a data pattern. Relevancy may be determined by a relevancy score. A relevancy score may be automatically generated by at least a processor 102, received from a machine learning model, and/or received from the plurality of first entities 108. In some embodiments, a relevancy score may include a range of numerical values that may correspond to a relevancy strength of data received from a web crawler function.

With continued reference to FIG. 1, provider data 106 may be further received using optical character recognition (OCR). In an embodiment, apparatus 100 may allow plurality of first entities 108 to provide one or more documents containing provider data 106. For the purposes of this disclosure, "document" is a recorded piece of information. In some cases, document may include one or more premade templates (e.g., templates for inventory information, employee records, business objectives, and/or the like). In some cases, document containing provider data 106 may be submitted using provider device 112; for instance, and without limitation, a first entity e.g., a vendor may list inventory information in an EXCEL spreadsheet that may be automatically formatted and uploaded instantaneously to processor 102 using provider device 112 through one or more application programming interfaces (APIs). As used in this disclosure, an "optical character recognition" is a technology that enables the recognition and conversion of printed or written text into machine-encoded text. In some cases, at least a processor 102 may be configured to recognize a keyword e.g., provider data keyword, from document using the OCR to find provider data 106. In some embodiments, at least a processor 104 may be configured to recognize a provider data keyword from provider data 106 using OCR.

Still referring to FIG. 1, a "provider data keyword," for the purposes of this disclosure, is a keyword or a set of keywords that are used to represent and describe the attributes or characteristics of plurality of first entities 108 e.g., a plurality of providers. In a non-limiting example, the provider data keyword may include clothing and fashion, electronics and gadgets, home and kitchen, health and beauty, sports and fitness, books and media, baby and kids, groceries and good, automotive travel and experiences, and/or the like. In another non-limiting example, provider data keyword may be consistent with provider indicator described herein. In some embodiments, processor 102 may be configured to recognize provider data keyword from provider data 106 using the OCR. In a non-limiting example, when provider data 106 includes data describing a specific product or service a provider wants to offer in a document, process 102 may recognize provider data keyword using OCR from the document. In some cases, at least a processor 104 may transcribe much or even substantially all provider data 106.

With continued reference to FIG. 1, in some embodiments, OCR may include automatic conversion of images of written (e.g., typed, handwritten or printed text) into machine-encoded text. In some cases, recognition of a provider data keyword from provider data 106 may include one or more processes, including without limitation, OCR, optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 4-6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 4-6.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 102 is configured to generate a plurality of provider models 116 in a digital environment 118. As used in this disclosure, "provider models" are data structures that facilitate manners in which services, products or other contents are provided in digital environment 118. A "digital environment," for the purpose of this disclosure, is an integrated communications environment where digital devices communicate and manage data and interactions within the digital environment 118. Digital device may be any electronic device as described in this disclosure that uses a digital signal instead of an analog signal for processing and transmitting data such as, without limitation, processor 102, provider device 112, user device, any computing device, and the like. In an embodiment, any processing step described in this disclosure may be performed in digital environment 118. Apparatus 100 may be connected to the digital environment 118 through a network. Network may include a computer network containing one or more data connections between one or more network nodes. In some embodiments, network may include, without limitation, personal area network (PAN), local area network (LAN), mobile ad hoc network (MANET), metropolitan area network (MAN), wide area network (WAN), cellular network, global area network (GAN), space network, and the like.

Still referring to FIG. 1, in an embodiment, network may include, participate in, and/or be incorporated in a network topology. A "network topology" as used in this disclosure is an arrangement of elements of a communication network. In some embodiments, network may include, but is not limited to, a star network, tree network, and/or a mesh network. A "mesh network" as used in this disclosure is a local network topology in which the infrastructure nodes connect directly, dynamically, and non-hierarchically to as many other nodes as possible. Network nodes may be configured to communicate in a partial mesh network. A partial mesh network may include a communication system in which some nodes may be connected directly to one another while other nodes may need to connect to at least another node to reach a third node. In some embodiments, network may be configured to communicate in a full mesh network. A full mesh network may include a communication system in which every network node in network may communicate directly to one another. In some embodiments, network may include a layered data network. As used in this disclosure a "layered data network" is a data network with a plurality of substantially independent communication layers with each configured to allow for data transfer over predetermined bandwidths and frequencies. As used in this disclosure a "layer" is a distinct and independent functional and procedural tool of transferring data from one location to another. For example, and without limitation, one layer may transmit communication data at a particular frequency range while another layer may transmit communication data at another frequency range such that there is substantially no crosstalk between the two layers which advantageously provides a redundancy and safeguard in the event of a disruption in the operation of one of the layers. A layer may be an abstraction which is not tangible.

With continued reference to FIG. 1, in an embodiment, each provider model of plurality of provider models 116 may encompass data representing a plurality of strategies and methods employed by plurality of first entities 108 to deliver its offerings digitally, as well as the relationship between first entities 108, second entities (i.e., customers), and potentially third entities (other stakeholders such as advertisers, third-party service providers/sellers, and/or the like). In some cases, each provider model of plurality of provider models 116 may include a deployment of one or more streamlined digital operations, e.g., computer process in replacement of physical operations performed by plurality of first entities 108, second entities, and/or third entities in an actual environment (i.e., physical environment). In a non-limiting example, each provider model of plurality of provider models 116 may include a digital framework or software application in digital environment 118 that allows plurality of first entities 108 and other individuals to sell and buy goods or services over the internet. Such provider model may include an e-commerce platform.

With continued reference to FIG. 1, generating the plurality of provider models 116 may include creating a plurality of provider data structures 120 as a function of provider data 106, wherein each provider data structure of the plurality of provider data structures 120 is associated with at least one first entity of plurality of first entities 108. As used in this disclosure, each "provider data structures" of plurality of provider data structures 120 is a way in which data related to each individual first entity (e.g., provider data 106 corresponding to individual first entity) is organized and stored within digital environment 118. In an embodiment, creating plurality of provider models 116 may include organizing provider data 106 into a structured format that can be easily stored, accessed, and manipulated by processor 102. In some cases, plurality of provider data structures 120 may be presented visually, through visual interface as described in further detail below, to all other entities. In a non-limiting example, each provider data structure of plurality of provider data structures 120 may include a virtual store that enables at least one first entity to operate in the digital environment 116.

Still referring to FIG. 1, in some cases, each provider data structure of plurality of provider data structures 120 may include at least a provider object 122. As used in this disclosure, a "provider object" is a specific entity within provider data structure that digitally represents at least a piece of content (e.g., products, services, and/or any other content described in this disclosure) in digital environment 118. In some cases, provider data structure of plurality of provider data structures 120 may include a plurality of provider objects. In a non-limiting example, each provider data structure of plurality of provider data structures 120 may include a provider object listing containing a plurality of provider objects, wherein each provider object of plurality of provider objects may include an instance or component of corresponding provider data structure that holds information about a single product or service. Each provider object of plurality of provider objects may serve as a container of product or service at least one first entity offers within a provider data structure associate with at least one first entity. In some cases, at least a provider object 122 may be configured to incorporate data elements such as, without limitation, product/service identifier (ID), name, description, price, and/or the like.

With continued reference to FIG. 1, as used in this disclosure, a "provider object listing" is a structured collection of individual implementation of provider objects that are organized and stored in a sequence based on a specific criteria. In some cases, specific criteria may include, without limitation, product/service categories, product/service expiration date, product/service price, product/service deliverables, product/services status, product/services reviews, and/or the like. In an embodiment, provider object listing may be presented, as a data structure containing a plurality of data elements (i.e., attributes or properties) ordered in a specific order defined based on criterions listed above, wherein each data element of the plurality of data elements of the data structure May represent an individual provider object. In a non-limiting example, provider object listing may be configured to keep track of service details, product inventory, product sales, and/or the In some cases, provider object listing may be viewed, sorted, and/or manipulated by first entities while creating corresponding provider data structures. Additionally, or alternatively, provider object listing may be implemented, by processor 102, as any data structure as described in this disclosure, including, without limitation, list, array, linked list, database table, or any other data structure suitable for storing a collection of items, wherein each item in provider object listing may represent a distinct provider object.

Still referring to FIG. 1, creating a plurality of provider data structures 120 may include initializing at least a provider object 122. In an embodiment, at least one first entity may provide provider data 106 containing data related to a specific product or service offered by at least one first entity in a data interchange format (i.e., a data format used for transmitting and storing data that is human-readable). In a non-limiting example, initializing at least a provider object 122 may include processing, by processor 102, provider data 106 in a key value pair format (e.g., a dictionary). In some cases, provider data 106 may be received as an unordered set of key value pairs (i.e., a data structure consisting of a unique identifier as a key and a corresponding value associated with the key). In a non-limiting example, provider data 106 may be expressed as "{first key value pair, second key value pair}," wherein the first key value pair and the second key value pair may be separate by a separator, and wherein both first key value pair and second key value pair may be expressed as "first/second key: first/second value." First/second key may include unique identifier of a first or a second provider object; for instance, and without limitation, a first or a second product ID associate with a first or a second product/service. First/second value associated with first/second key may include one or more data elements pertaining to first or second product/service such as, without limitation, product/service name, description, price, category, images, stock level, reviews, and/or the like. Processor 102 may be configured to iterate through the set of key value pairs, initialize a provider object as a function of each key value pair within the set, and create plurality of provider data structures 120 by incorporating the initialized provider objects into corresponding provider data structure. Other exemplary embodiments of data interchange format for transferring and/or processing provider data 106 may include, without limitation, list, queue, stack, map, graph, tree, and the like. As will be appreciated by persons having ordinary skill in the art, after having read the entirety of this disclosure, the foregoing list is provided by way of example and other data structures can be added as an extension or improvements of apparatus 100 disclosed herein.

With continued reference to FIG. 1, in some cases, digital environment 118 may include a cloud environment. As used in this disclosure, a "cloud environment" is a set of systems and/or processes acting together to provide services in a manner that is dissociated with underlaying hardware and/or software within apparatus 100 used for such purpose and includes a cloud. A "cloud," as described herein, refers to one or more servers that are accessed over the internet. In some cases, cloud may include Hybrid Cloud, Private Cloud, Public Cloud, Community Cloud, any cloud defined by National Institute of Standards and Technology (NIST), and the like thereof. In some embodiments, cloud may be remote to apparatus 100; for instance, cloud may include a plurality of functions distributed over multiple locations external to apparatus 100. In a non-limiting example, plurality of provider models 116 and/or provider data structures 120 may be created in cloud environment.

Still referring to FIG. 1, generating plurality of provider models 116 and/or creating provider data structures 120 in cloud environment may include implementing cloud computing using processor 102, wherein the "could computing," as described herein, is an on-demand delivery of information technology (IT) resources within network through internet, without direct active management by plurality of first entities 108. In an embodiment, without limitation, each provider model of plurality of provider models 116 and/or each provider data structure of plurality of data structures 120 may be implemented as a Software-as-a-Service (i.e., a cloud computing service model which make provider models and/or provider data structures available to different entities using apparatus 100 directly); for instance, and without limitation, Software-as-a-Service (SaaS) provider model/provider data structure may provide partial or entire set of functionalities of apparatus 100 to entities interacting with it without direct installation of the entire set of functionalities. In a non-limiting example, data store 114 may run on one or more cloud servers.

With continued reference to FIG. 1, generating plurality of provider models includes identifying a plurality of proximate provider data structures 124 as a function of plurality of provider indicators 110 using a provider data structure classifier. Provider data structure classifier is described herein below. As used in this disclosure, "proximate provider data structures" refers to two or more provider data structures, at least a portion of contained data are related, similar, or otherwise close to one another. In some cases, proximity may be based on various dimensions such as, without limitation, geographic location, similarity of products or services, similar target customers, similar business models, and/or the like.

In a non-limiting example, and still referring to FIG. 1, plurality of proximate provider data structures 124 may be identified by each provider indicator e.g., a geographic indicator such as a zip code of first entity corresponding to each provider data structure of plurality of provider data structures 120. Processor 102 may be configured to identify first entities that are physically located near each other, for example, online stores (i.e., provider data structures) that are located in the same city, state, or region.

Still referring to FIG. 1, in some cases, first entities corresponding to plurality of proximate provider data structures 124 may include, without limitation, sellers having physical retail stores located in the same area, sellers providing services that are delivered in person, sellers owning regional warehouses, and/or the like. Processor 102 may be configured to identify plurality of proximate provider data structures 124 as a function of provider indicators and/or other provider data containing geographic information such as, without limitation, GPS coordinate, zip code, and/or the like as described above. Processor 102 may utilize one or more algorithms (e.g., Euclidean distance, haversine formula, nearest neighbor search, Voronoi diagram, and/or the like) or data structures (e.g., may, graph, or the like) designed for spatial data to efficiently query and analyze such geographic information.

Still referring to FIG. 1, in an embodiment, plurality of geographically proximate provider data structures may be identified, by processor 102, based on a plurality of geofences. Apparatus 100 may implement one or more aspect of geofencing (i.e., a location-based technology that utilizes GPS, Radio Frequency Identification [RFID], or cellular data to create a virtual boundary or "geofence" round a specific geographic area. In a non-limiting example, geofences may include cities, neighborhoods, or even specific streets. In an embodiment, apparatus 100 may be configured to monitor and be triggered to perform any processing steps as described in this disclosure when first entity with provider devices enters or exits established geofences. Identifying plurality of proximate provider data structures may include checking plurality of provider indicators 110 associated with each first entity against the boundary of the geofence; Any provider whose coordinates fall within the boundary may be considered "proximate."

Additionally, or alternatively, and still referring to FIG. 1, identifying plurality of proximate provider data structures 124 may include comparing each provider indicator of plurality of provider indicators 110 against a reference indicator 126 and identifying plurality of proximate provider data structure 124 as a function of the comparison of the plurality of provider indicators and the reference indicator 126. A "reference indicator," for the purpose of this disclosure, is a standard or benchmark against which other provider indicators are compared by processor 102. In some cases, reference indicator 126 may be pre-defined, by processor 102, and may serve as a point of reference for determining proximity or similarity of plurality of provider data structures 124. In some cases, each provider model of plurality of provider models 116 may be associated with a distinct reference indicator. In a non-limiting example, comparing each provider indicator of plurality of indicators 110 against reference indicator 126 may include determining an address relation, wherein the "address relation," as described herein, is a relation data (i.e., data that shares common attributes or characteristics) that is determined as a function of a provider address (i.e., provider indicator) and a pre-determined address (i.e., reference indicator) such as a center point of a pre-determined area. For example, and without limitation, when a provider indicator contains "02210" as a first entity's zip code and a reference indicator contains "02210" as a reference zip code, then provider data structure associated with the provider indicator may be identified, by processor 102, as a proximate provider data structure.

With continued reference to FIG. 1, in some cases, plurality of proximate provider data structures 124 may include a plurality of category-based proximate provider data structures (i.e., provider data structures associated with first entities that sell products or services within the same category). In a non-limiting example, processor 102 may be configured to query information e.g., product/service categories associated with each provider object 122 within each provider data structure of plurality of provider data structures 120. In some cases, product/service categories may include a simple string (e.g., "electronics" or "furniture"), or it may be a more complex structure such as a tree like "electronics>computers>laptops." In some cases, processor 102 may be configured to identify plurality of category-based proximate provider data structures by finding exact matches or similar provider objects from plurality of provider objects within provider object listing; for instance, and without limitation, two provider data structures having provider object listings containing certain number of exact or similar provider objects may be considered category-based proximate provider data structures.

Still referring to FIG. 1, other exemplary proximate provider data structures may include, without limitation, target market proximate provider data structures (i.e., provider data structures associated with first entities that target same customer demographic [e.g., millennials, pet owners, fitness enthusiasts, and/or the like]), business model proximate provider data structures (i.e., provider data structures associate with first entities that implement the same business model [e.g., subscription model, a freemium model, a direct sales model, and/or the like]), among others. As will be appreciated by persons having ordinary skill in the art, after having read the entirety of this disclosure, the foregoing list is provided by way of example and other proximate data structures can be added as an extension or improvements of apparatus 100 disclosed herein.

With continued reference to FIG. 1, in some embodiments, identifying plurality of proximate provider data structures 124 may include determining a proximity score for each provider data structure of plurality of provider data structures 120 and identify plurality of proximate provider data structures 124 as a function of the proximity score of each provider data structure of plurality of provider data structures 120. For the purposes of this disclosure, a "proximity score" is a value representing an evaluation of the proximity between at least two provider data structures. In some embodiments, proximity score may be stored in and/or retrieved from data store 114. In an embodiment, the proximity score may include a quantitative characteristic, such as a numerical value. As a non-limiting example, proximity score may include numeric value such as 0, 1, 2, 3, 5, 10, 20, 100, and the like, where a higher proximity score may associate with a more proximate provider indicator of a first entity (compared to reference indicator 126) and lower proximity score may associate with less proximate provider indicator of another first entity. In some embodiments, proximity score may start from 0, which may mean that there is no proximity between a given provider indicator and reference indicator 126. As proximity score is approaching 100, provider data structure associated with the given provider indicator may be more proximate to a provider data structure associated with reference indicator 126. In some embodiments, proximity score for each provider data structures may be updated in real-time as the at least a processor 102 iterates through plurality of provider data structures 120. In some cases, proximity score may be calculated, by processor 102, using various scoring/ranking algorithms such as, without limitation, Euclidean distance, cosine similarity, Jaccard index, and/or the like. Processor 102 may be configured to select one or more provider data structures associated with high proximity score as proximate provider data structures.

Still referring to FIG. 1, in some cases, determining proximity score for each provider data structure of plurality of provider data structures 120 may include clustering, using processor 102, plurality of provider data structures 120 into a plurality of provider clusters, wherein each provider cluster of the plurality of provider clusters may include plurality of proximate provider data structures 124. In an embodiment, processor 102 may be configured to cluster plurality of provider data structures 120 using a k-means clustering algorithm. A "k-means clustering algorithm" as used in this disclosure, includes cluster analysis that partitions n observations or unclassified cluster data entries into k clusters in which each observation or unclassified cluster data entry e.g., provider data structures belong to the cluster with the nearest mean, using, for instance provider data 106 including provider indicators 110 as described above. "Cluster analysis" as used in this disclosure, includes grouping a set of observations or data entries in a way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of gene combinations with multiple disease states, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, clustering structure and provider data structures 116 may include generating a first vector output containing a provider cluster, generating a second vector output containing an input provider data structure, and calculating the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, processor 102 may generate a k-means clustering algorithm receiving unclassified provider data structures and outputs a definite number of classified provider clusters wherein the provider clusters each contain a plurality of proximate provider data structures 124. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related physiological data, which may be provided with user cohort labels; this may, for instance, and without limitation, generating an initial set of proximate provider data structures (i.e., initial provider cluster) from plurality of provider data structures 120 associated with plurality of first entities 108, and may also, upon subsequent iterations, identify new provider clusters to be provided new groups of proximate provider data structures, to which additional provider data structures may be classified, or to which previously classified provider data structures may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $argmin_{ci \ni C}$ dist(ci, x)$^2$, where argmin includes argument of the minimum, ci includes a collection of centroids in a set C, and dist includes standard Euclidean distance. K-means clustering module may then recompute centroids by taking the mean of all cluster data entries assigned to a centroid's cluster. This may be calculated based on ci=1/|Si|Σxi∋ Si$^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each provider of plurality of provider clusters generated by k-means clustering algorithm. Degree of similarity index value may indicate how close a particular combination of genes, negative behaviors and/or negative behavioral propensities is to being classified by k-means algorithm to a particular cluster. K-means clustering algorithm may evaluate the distances of the combination of data elements within provider data 106 such as, without limitation, provider identification data, operational data, performance data, provider indicators, provider data keywords, and/or the like, to the k-number of clusters output by k-means clustering algorithm. Short distances between a first provider cluster and a second provider cluster or plurality of provider data structures 120 may indicate a higher degree of similarity between the first provider cluster and the second provider cluster or plurality of provider data structures 120. Conversely, a longer distance between first provider cluster and second provider cluster or plurality of provider data structures 120 may indicate a lower degree of similarity between first provider cluster and second provider cluster or plurality of provider data structures 120.

Still referring to FIG. 1, k-means clustering algorithm selects a classified data entry cluster as a function of the degree of similarity index value. In an embodiment, k-means clustering algorithm may select a classified provider cluster with the smallest degree of similarity index value indicating a high degree of similarity between the selected provider cluster and the rest of provider clusters. Alternatively, or additionally k-means clustering algorithm may select a plurality of provider clusters having low degree of similarity index values to plurality of provider data structures 120, indicative of greater degrees of similarity. Degree of similarity index values may be compared to a threshold number indicating a minimal degree of relatedness suitable for inclusion of provider data structures in a provider cluster, where degree of similarity indices a-n falling under the threshold number may be included as indicative of high degrees of relatedness. The above-described illustration of feature learning using k-means clustering is included for illustrative purposes only and should not be construed as limiting potential implementation of proximate provider data structures identification; persons skilled in the art, upon reviewing the entirety of this disclosure, will be aware of various additional or alternative clustering algorithms that may be used consistently with this disclosure.

With continued reference to FIG. 1, additionally, determining proximity score for each provider data structure of plurality of provider data structures 120 may further include assigning a quality score to each classified provider cluster, wherein the quality score is determined, by processor 102 as a function of degree of similarity index value, and determining proximity score for each provider data structure of plurality of provider data structures 120 as a function of quality score of each provider cluster. As described in this disclosure, a "quality score" refers to a measure or metric that assesses the quality or validity of a clustering result. In a non-limiting example, quality score of each classified provider cluster may be computed, by processor 102, using silhouette method. As used in this disclosure, "silhouette method" is a technique used in clustering analysis to evaluate quality of clustering result. In some cases, silhouette method may provide a measure of how well (e.g., close) each provider data structure of each dataset of plurality of proximate provider data structures 124 fits into assigned provider cluster, indicating a compactness and separation of provider clusters. The silhouette method may compute silhouette coefficients of each provider data structures of plurality of provider data structures 116 that measure how much each provider data structure is like its own provider cluster compared to other provider clusters by providing a succinct graphical representation of how well each provider data structure has been classified. The analysis of these graphical representations may be called "silhouette analysis." In an embodiment, processor 102 may be configured to determine a quality score for each provider cluster as a function of silhouette coefficients, each ranges from −1 to 1, and measures an average cohesion and separation of provider data structures within and between each plurality of provider data structures 116. In some cases, higher value of quality score may indicate better-defined provider cluster (i.e., provider data structures within the cluster are more proximate to each other).

In a non-limiting example, and still referring to FIG. 1, computing silhouette coefficient may require a plurality of $O(N^2)$ pairwise distances, wherein each pairwise distance refers to a distance between all provider data structures within a first provider cluster $(C_I)$: $i \in C_I$. Processor 102 may be configured to compute a mean distance $\alpha(i)$ between provider data structure i and all other provider data structures in first provider cluster $C_i$ using following equation:

$$a(i) = \frac{1}{|C_I| - 1} \sum_{j \in C_I, i \neq j}^{n} d(i, j),$$

wherein $|C_I|$ is the number of provider data structures belonging to first provider cluster $C_I$ and $d(i,j)$ is the distance between a first provider data structure i and a second provider data structure j in first provider cluster $C_I$. In some cases, mean distance $\alpha(i)$ may measure how well provider data structure i is assigned to its cluster (i.e., smaller the value, the better the assignment). Processor 102 may then be configured to compute a mean dissimilarity b of provider data structure i to a second provider cluster $C_j$ as the mean of distance from provider data structure i to all other provider data structures in $C_j$ using following equation:

$$b(i) = \min_{J \neq I} \frac{1}{|C_j|} \sum_{j \in C_J} d(i, j),$$

where $C_j \neq C_I$. In some cases, second provider cluster $C_j$ with smallest mean dissimilarity b may said to be the "neighboring cluster" of first provider cluster $C_i$ because it is the next best fit cluster each provider data structures within the first provider cluster $C_I$. Quality score e.g., silhouette value/coefficient may then be determined, by processor 102, using following equation:

$$s(i) = \frac{b(i) - a(i)}{\max\{a(i), b(i)\}},$$

if and only if $|C_I|$ is greater than 1. In some cases, silhouette coefficient may be 0 if $|C_I|$ is equal to 1. Other exemplary quality scores may include, without limitation, Dunn index, Davies-Bouldin Index, Calinski-Harabasz Index, and the like. Persons skilled in the art, upon reviewing the entirety of this disclosure, will be aware of various ways in which quality score for each provider cluster may be determined, calculated, and assigned by processor 102 described herein, consistently with this disclosure.

With continued reference to FIG. 1, processor 102 may use a machine learning module 128 to implement one or more algorithms or generate one or more machine learning models, such as a proximate provider data structure identification machine learning model 130 to identify a plurality of proximate provider data structures 124 from plurality of provider data structures 120. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Machine learning module 128 may be used to generate proximate provider data structure identification machine learning model 130 and/or any other machine learning model, such as, agent selection machine learning model, provider landscape generation machine learning model, and the like as described in further detail below, using training data. Proximate provider data structure identification machine learning model 130 may be trained by correlated inputs and outputs of training data. Training data may be data sets that have already been converted from raw data whether manually, by machine, or any other method. Training data may include previous outputs such that proximate provider data structure identification machine learning model 130 iteratively produces outputs. Proximate provider data structure identification machine learning model 130 using a machine-learning process may output converted data based on input of training data.

In some cases, and still referring to FIG. 1, identifying plurality of proximate provider data structures 124 may include identifying plurality of proximate provider data structures using proximate provider data structure identification machine learning model 130 generated by machine learning module 128. Proximate provider data structure identification machine learning model 130 may be trained by training data, wherein the training data may be stored in a database such as data store 114 as described above. In a non-limiting example, determining a plurality of proximate provider data structures 124 using a machine learning model may include receiving proximate provider training data. In an embodiment, proximate provider training data may include a plurality of provider indicator groups (i.e., a set of provider indicators) that each correlated to a plurality of proximate provider indicator groups (i.e., a set of provider indicators that are proximate to each other). In another embodiment, proximate provider training data may include a plurality of provider data structures that each correlated to a plurality of proximate provider data structures. For example, and without limitation, proximate provider training data may be used to show information related to first entities and/or provider data structures associated with first entities may indicate a particular group of proximate first entities and/or provider data structures. Additionally, proximate provider training data may include previously input proximate provider data sets and their corresponding classification output. Proximate provider data structure identification machine learning model 130 may be iterative such that outputs may be used as future inputs of the machine learning model. This may allow the proximate provider data structure identification machine learning model 130 to evolve. Processor 102 may be configured to train proximate provider data structure identification machine learning model 130 using proximate provider training data and determined a plurality of proximate provider data structures 124 as a function of plurality of provider indicators 110 using trained proximate provider data structure identification machine learning model 130.

Still referring to FIG. 1, in some cases, proximate provider data structure identification machine learning model 130 may include a provider data structure classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 102 and/or another device may generate a classifier using a classification algorithm, defined as a process whereby a processor 102 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 102 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) \ P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 102 may then calculate a likelihood table by calculating probabilities of different data entries and classification labels. Processor 102 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 102 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating plurality of provider models 116 may include generating at least one provider model 132 by integrating plurality of proximate provider data structures 124. In some cases, integration of plurality of proximate provider data structures 124 may take various forms depending on objectives and/or specifics of the provider model, nature of proximity, and/or the like. In an embodiment, integration of plurality of proximate provider data structures 124 may include grouping plurality of proximate provider data structures 124 in one or more database or interface in digital environment 118 such as any database or interface described herein. In some cases, at least one provider model 132 may be generated via a virtual grouping (i.e., tagging or labeling one or more proximate provider data structures of plurality of proximate provider data structures 124 as being part of the same group). In a non-limiting example, in a given provider model, all plurality of proximate provider data structures 124 including a provider object listing containing mostly electronics, identified from plurality of provider data structures 120, may be tagged as "Electronics Providers" by processor 102. In some cases, such integration of plurality of proximate provider data structures 124 may allow for efficient querying and filtering based on group label using at least one provider model 132.

Still referring to FIG. 1, in another embodiment, integrating plurality of proximate provider data structures 124 may include displaying plurality of proximate provider data structures 124 as a whole via at least one provider model 132 (in a visual interface as described in further detail below). In some cases, integrating plurality of proximate provider data structures may include linking plurality of proximate provider data structures 124 to at least one provider model 132. In a non-limiting example, first entities selling similar products and/or services may have their provider data structures (i.e., online stores) displayed on a same page or in a same section of the website or app. Link plurality of proximate provider data structures 124 to at least one provider model 132 may include introducing one or more existing provider data structures within digital environment 118 (i.e., provider data structures previously created e.g., sellers' original websites) into at least one provider model 132. For example, and without limitation, processor 102 may be configured to display one or more uniform resource locators (URLs) of existing (proximate) provider data structure in at least one provider model 132. In such an embodiment, displaying plurality of proximate provider data structures 124 may enable second entities to easily find and compare plurality of proximate provider data structures 124 within at least one provider model 132.

Still referring to FIG. 1, in another embodiment, integrating plurality of proximate provider data structures 124 into at least one provider model 132 may include prioritizing/ranking plurality of proximate provider data structures. In some cases, processor 102 may be configured to prioritize/rank plurality of proximate provider data structures 124 using one or more recommendation algorithms. In a non-limiting example, processor 102 may utilize collaborative filtering that automatically predicts user's interest by collecting preferences from many users across digital environment 118. In another non-limiting example, processor may utilize content-based filtering that characterizes information related to a user to provide recommendations used to prioritize/rank plurality of proximate provider data structures for the user based on similarity in content within at least one provider model 132, e.g., if a user often buys mystery novels on an online bookstore, then apparatus 100 may recommend other similar online bookstores having similar mystery novels in stock for the user. In another non-limiting example, proximity score of each proximate provider data structure may be used, by processor 102, to prioritize/rank plurality of proximate provider data structures 124 within at least one provider model 132. Generally, proximate provider data structures with higher proximity score may be ranked higher among plurality of proximate provider data structures 124. Other exemplary metrics may be used by processor 102 for prioritization of plurality of proximate provider data structures 124 may include, without limitation, provider data 106 (e.g., operational data including provider performance, business objectives, and/or the like). In other cases, apparatus 100 may include a degree of randomization in prioritization and/or ranking of plurality of proximate provider data structures 124, to ensure diversity of offerings and give all first entities a fair chance to be discovered by users in digital environment 118.

Additionally, or alternatively, and still referring to FIG. 1, integrating plurality of proximate provider data structures may include sharing certain resources or infrastructures within at least one provider model 132. In some cases, multiple proximate provider data structures may leverage common infrastructure, services, or digital assets. In a non-limiting example, plurality of proximate providers (typically providers with identical provider indicators e.g., providers within the same geographic area) may share distribution or fulfillment facilities, allowing them to pool resources for storage, packing, shipping, and the like in order to save the cost and increase the efficiency. Other exemplary resources or infrastructures may include, without limitation, delivery services, marketing or advertising campaigns, digital infrastructures, customer support services, and/or the like. Generating at least one provider model 132 may include integrating plurality of proximate provider data structures by coordinating the use of these shared resources or infrastructures. Further, integrating plurality of proximate provider data structures 124 may also include cross-promoting each other's provider objects. For example, and without limitation, if a user buys a product from one provider within at least one proximate provider within corresponding provider model, the platform could recommend related products from other proximate providers similar to the at least one proximate providers.

With continued reference to FIG. 1, in some cases, provider model may be generated, by processor 102, in various forms. In an embodiment, processor 102 may be configured to generate one or more direct sales models, wherein "direct sales models," for the purpose of this disclosure, are provider models that allows a direct interaction between provider models described herein and end user (e.g., service providers, marketplace sellers, local vendors/suppliers, and any entities and/or users described herein) within digital environment 118. In a non-limiting example, in direct sales model, corresponding first entity or first entities may sell offerings directly to end users e.g., customers. In some cases, direct sales models may include app stores where entities can download or purchase digital content, such as an application, from digital environment 118.

Still referring to FIG. 1, in another embodiment, processor 102 may be configured to generate one or more subscription models, wherein "subscription models," for the purpose of this disclosure, are provider models that only allow authorized end users within digital environment 118 to manipulate, access, or otherwise interact with such provider models. In an embodiment, end users, including first entity associated with subscription model, may be authorized by an authentication datum corresponding to each end user, for example, and without limitation, a membership token obtained by paying a recurring fee at regular intervals to access subscription model and plurality of integrated proximate provider data structures 124 including provider data objects 122. In a non-limiting example, end user may sign up for a specific duration or frequency of subscription and gain access to product or service during that specific period. In some cases, subscription may be renewed automatically or manually based on the configuration (e.g., terms and conditions) of the corresponding subscription model. In some cases, processor 102 may be configured to manage and track entity subscriptions, handle billing and payment processing (as described in further detail below) and provide access to subscribed provider models.

Still referring to FIG. 1, as used in this disclosure, an "authentication datum" refers to a piece of information or data used to verify an entity's identity within digital environment 118. In an embodiment, authentication datum may help ensure that only authorized user can manipulate, access, or otherwise interact with plurality of provider models 116, such as, without limitation, subscription models described herein, within digital environment 118. In some cases, authentication datum may serve as a key to protect plurality of provider models 116 from unauthorized access and maintaining security and privacy. In some cases, authentication datum may include, without limitation, passwords, tokens, or event biometric information combined with a unique identifier representing an entity such as, without limitation, a username (e.g., email address), to establish the entity's identity within digital environment 118. In a non-limiting example, authentication datum may include a password first entity previously set up during registration of an account in digital environment 118.

In one or more embodiments, and still referring to FIG. 1, authentication datum may be optionally associated with a right. In an embodiment, right may be linked to corresponding entity of authentication datum described herein. In a non-limiting example, authentication datum may optionally include one or more data elements describing a plurality of rights. A "right," as described herein, refers to a specific privilege or permission within digital environment 118. In an embodiment, right may include an entitlement granted to corresponding entities based on their relationship with plurality of provider models 116 and/or plurality of integrated proximate provider data structures 120. In some cases, rights described herein may include access to exclusive provider data structures and/or provider objects, Ad-free experience, early access or priority access to selected provider data structures and/or provider objects, discounts on certain provider objects, enhanced support or customer service, additional features of provider models, community, or membership perks, and/or the like.

In a non-limiting example, and still referring to FIG. 1, right may be determined based on the membership status of the user. A "membership status," as described herein, is a classification or understanding of entities within digital environment 118 based on the entities' participation, engagement, or otherwise adherence to the terms and conditions of a membership program. Rights that entities as a member may be entitled to receive may be subject to change based on factors such as, without limitation, duration of membership, payment of fees, accumulation of loyalty points, or fulfillment of specific requirements. For instance, and without limitation, membership status may be categorized in a tiered membership levels: "Good," "Better," and "Best." Higher membership tiers may grant rights with more exclusive benefits or privileges. "Good" membership level may signify that corresponding entity has a low membership status, and "best" membership level may signify that corresponding entity has a higher membership status. A different tier of membership level may allow corresponding entity to have increased benefits within digital environment 118 as listed above. In should be noted that entity may not be associated with any rights described herein. In a non-limiting example, a guest user may be able to at least access one or more provider models of plurality of provider models 116 including plurality of integrated proximate provider data structures 124.

Still referring to FIG. 1, in such an embodiment, authentication datum described herein may include membership data related to end users, wherein the membership data may describe end user's membership status. In some cases, membership data may signify a status of a give end user; for instance, and without limitation, membership data of a first end user may include a first membership level signifying that the first end user as first entity e.g., a seller or a service provider, whereas membership data of a second end user may include a second membership level signifying that the second end user an second entity e.g., a customer or a client, wherein the second membership level may be different (e.g., higher) than the first membership level. In a non-limiting example, first end user with first membership level may have access to the back-end (e.g., seller portal) of provider models and/or provider data structures, while second end user with second membership level does not.

With continued reference to FIG. 1, other exemplary embodiments of provider models may include, without limitation, a freemium provider model (i.e., a provider model that offers basic services for free but charges for access to premium features or contents), an advertising provider model (i.e., a provider model that offers free services to end users and generates values by displaying commercials/advertisements), a marketplace provider model (i.e., a provider model that operates a platform involving third-party entities offering their products or services to end users and a value [e.g., commission] may be generate on each transaction, a data monetization model (i.e., a provider model that collects data related to end users including their behaviors and uses such data to generate values), among others. Persons skilled in the art, upon reviewing the entirety of this disclosure, will be aware of various ways in which various provider models may be modeled by processor 102 described herein, consistently with this disclosure.

With continued reference to FIG. 1, each provider model of plurality of provider models 116 may include a plurality of access levels 134. In some cases, each first entity of plurality of first entities 108 may be associated with at least an access level of plurality of access levels 134. As used in this disclosure, an "access level" refers to the degree of access that a particular entity has to resources within digital environment 118. In some cases, resources may include plurality of provider models 116 and elements thereof, including plurality of integrated proximate provider data structures 124 and corresponding provider objects 122. In other cases, resources may also include data, components, functionalities, devices, or otherwise operations within digital environment 118. In an embodiment, each access level of plurality of access levels 134 may be defined as an access control policy which determines, for example, and without limitation, which entity is allowed to access which provider model and/or provider data structure under what conditions.

Still referring to FIG. 1, in an embodiment, plurality of access levels 134 may include an "Admin." First entity associate with such access level may have the highest level of access. In such embodiments, first entity may be able to manage one or more corresponding provider data structures; for instance, and without limitation, add, modify, or remove data within corresponding provider data structure(s). In a non-limiting example, first entity that is "admin" (i.e., administrator) may be able to manage its inventory, modifying provider objects (e.g., set prices, change names, update descriptions, and/or the like), processing orders, or even assigning assess level to its sub-entities. In some cases, administrator may be able to customize related provider data 106; for instance, and without limitation, customize minor pages e.g., "Home," "About Us," "Contact Us," and the like of entities own website. In some cases, administrator may be able to hold or stop the published products/services (i.e., initialized provider objects), setting recommended products/services, sorting products/services, among other similar functionalities on corresponding provider data structures. Additionally, or alternatively, "admin" may also be able to view, approve, disapprove, update, deny, and delete seller-requested product/services. Other exemplary access levels consistent with this disclosure are described in further detail below.

With continued reference to FIG. 1, processor 102 is configured to process a digital communication 134 between at least one provider model 132 and a user model 136. As used in this disclosure, a "digital communication" refers to an exchange of information or data described herein between different entities within digital environment 118. In an embodiment, digital communication 134 may be carried out between one or more network nodes, wherein one or more network nodes may include one or more wire or wireless connection between a first network node and a second network node. "Network nodes," for the purpose of this disclosure, is nodes as redistribution points in network within digital environment 118 described herein. In some cases, network node may include a communication endpoint. In a non-limiting example, digital communication 134 may include one or more network packet (containing packet header, payload, signature, transferred data, among others) between each network nodes through one or more data connections, wherein the network packet is a unit of data to be exchanged (e.g., information about one or more proximate data structures integrated by at least one provider model 132, including information related to provider objects within the proximate data structures) between at least one provider model 132 and user model 136 within digital environment 118.

Still referring to FIG. 1, as used in this disclosure, a "user model" is a digital representation of a second entity 138 in digital environment 118. A "second entity," described herein, refers to an independent and distinct existence such as a legal person that access provider models to browse, search and purchase products or services provided by plurality first entities 108 as described above. In a non-limiting example, second entity 138 may include a user such as a customer or a client of one or more first entities. In an embodiment, user model 136 is modeled by processor 102, using user data 140 provided by or obtained from second entity. "User data," for the purpose of this disclosure, are information related to second entity 138. In an embodiment, user data 140 may include personal information such as, without limitation, user's name, email address, mailing/billing address, phone number, and the like. In some cases, personal information may also include demographic information such as, without limitation, age, gender, occupation, among others. In another embodiment, user data 140 may include user preference data such as, without limitation, preferred language, accessibility needs, interests, favorite products/services, or categories. In another embodiment, user data 140 may include behavioral data such as, without limitation, user's browsing history, purchase history, product rating, reviews, and any other behavioral data that reflects user's activities or interactions on provider models. Other exemplary user data 140 may include, without limitation, account data (i.e., data describing configurations of user model 136 e.g., username, password, privacy settings, notification preferences, and the like), social data (i.e., data describing user's social features e.g., social connections, message data, comments, shares, and any other social interactions), among others. Persons skilled in the art, upon reviewing the entirety of this disclosure, will be aware of various types of user data 140 may be used to model user model 136 described herein, consistently with this disclosure.

With continued reference to FIG. 1, in some cases, digital communication 134 may be initiated by user model 136. In an embodiment, digital communication 134 may include, without limitation, a digital inquiry initiated by user model 136. Processing digital communication 134 may include receiving, by processor 102, a digital inquiry 142 and generating a digital response 144 as a function of the digital inquiry 142. A "digital inquiry," for the purpose of this disclosure, refers to a data element describing an action of making a request or seeking information stored in digital environment 118 through digital means using electronic devices such as, without limitation, a user device 146 (i.e., any additional computing device used by second entity 138 to access and/or interact with processor 102). In some cases, user device 146 may include, without limitation, user's smart phone, tablet, laptop, desktop and/or the like. In a non-limiting example, digital inquiry 142 may include a web request wherein the web request is a type of communication protocol for data transmission made by a client e.g., second entity 138 described herein. Communication protocol may include, but is not limited to, internet protocol (IP), transmission control protocol (TCP), inter-access point protocol, address resolution protocol (ARP), dynamic host configuration protocol (DHCP), file transfer protocol (FTP), internet control message protocol (ICMP), and the like thereof. In some cases, digital inquiry 142 may include an user interaction with one or more proximate provider data structures on one or more provider models, wherein the user interaction may include, without limitation, requesting information from one or more proximate provider data structures (e.g., product/service details, availability, or pricing), submitting data (e.g., questions, comments, reviews, ratings, and/or the like) to one or more provider models (including plurality of integrated proximate provider data structures 124), using chatbot to ask questions or receive automated response, interacting with a customer service through a live chat feature implemented by provider models, conducting searches on a built-in search engine of a provider model to find relevant information or resources, and/or the like.

Still referring to FIG. 1, as used in this disclosure, a "digital response" refers to information or action provided in response to described digital inquiry 142 generated through digital means and transmitted back to the entity initiated described digital inquiry 142. In should be noted that digital inquiry 142 may be initiated, not only by second entity 138, but also by plurality of first entities 108; for instance, and without limitation, creating new provider objects or adjusting existing provider objects on corresponding provider data structures, starting events (e.g., run promotional campaigns or discounts) on provider models, updating provider data 106, process returns or issue refunds for customer orders, and/or the like. Exemplary digital inquiries initiated by plurality of first entities 108 consistent with this disclosure are described below in greater detail. In some cases, generating digital response 146 may include communicating, by processor 102, digital inquiry 142 with plurality of provider models 116 and/or plurality of proximate provider data structures 124 integrated within one or more provider models. Digital response 146 generated based on digital inquiry may include, for example, and without limitation, an email reply containing requested information or addressing query, displaying a GUI (e.g., a webpage) with relevant search results or content matching inquiry through user device 146 and/or provider device 112, posting a response on provider models to answer a question or provide guidance, among others, in a timely manner.

With continued reference to FIG. 1, in some cases, apparatus 100 may implement a secure gateway configured to serve as a point of control and security between other different parts of the system, such as between at least a provider model 132 and user model 136 in digital environment 118. As used in this disclosure, a "secure gateway," also known as "secure gate," is a (cloud) service, application, or otherwise a device that is deployed at boundaries of the network (i.e., in between network nodes) to monitor and manipulate the traffic. In an embodiment, secure gateway may be responsible for ensuring the secure and controlled transmission of data or communications such as one or more digital communications 134 described herein, by incorporating various security measures including, without limitation, authentication, authorization, encryption/decryption, intrusion detection, among others. In such embodiment, digital inquiry 142 initiated by user model 136 may be accepted by secure gateway described herein; for instance, and without limitation, Processor 102 may include one or more implementation of application programming interface (API) gateway (i.e., a single point of entry for defined groups of microservices [e.g., user models]) configured to request routing, composition, and/or protocol translation by requiring API keys or OAuth tokens, validating digital inquiry 142, handling exceptions. For another example, without limitation, secure gateway may include a web application firewall (WAF) which is a specific type of secure gate that protects web applications e.g., plurality of provider models 116 by filtering and monitoring HTTP traffic (i.e., digital communications 134) in network. Such secure gateway may prevent attacks such as, without limitation, cross-site scripting (XSS), SQL injection, and other web application vulnerabilities. Additionally, or alternatively, apparatus 100 may utilize an authentication gateway to control access to the at least one provider model 132 and plurality or integrated proximate provider data structures 124 by verifying the identity of request entities e.g., users or systems. In some cases, authentication gateway may be configured to verify or validate authentication datum as described above; for instance, and without limitation, authentication gateway may incorporate one or more mechanisms such as, without limitation, usernames and passwords, two-factor authentication, digital certificates, and/or the like. Further, in some cases, secure gateway may be implemented by digital environment 118. In a non-limiting example, digital environment 118 may include implementations of secure socket layer (SSL) or transport layer security (TLS) gateways to establish a secure, encrypted data connection between entities and processor 102. Accordingly, digital communication 134 may be secured such that sensitive data such as, without limitation, personal information, credit card information, and/or the like may be transmitted securely.

Still referring to FIG. 1, processor 102 may be configured to handle a large number of provider models and/or user models to operate at any time while maintaining a reasonable response (e.g., digital response 144) time. In an embodiment, processor 102 may be configured to adjust available resources (e.g., computing power, data storage, connected devices, and/or the like) accordingly; for instance, and without limitation, processor 102 may utilize cloud computing resources as described above to quickly scaled up when the number of users increased and scale down when the demand decrease. In another embodiment, apparatus 100 may include one or more load balancers, wherein "load balancers," as described herein, refers to networking device or software component that evenly distributes incoming network traffic across a plurality of computing resources; for instance, and without limitation, load balancers may communicatively connected with processor 102 within digital environment 118, configured to distribute network or application traffic across multiple network nodes e.g., servers to ensure no single server is overwhelmed by increased number of digital inquiries initiated by increased number of user models, which may potentially lead to slower response times. In another embodiment, processor 102 may use caching to temporarily store frequently accessed data, for example, and without limitation, user data 140, frequently interacted provider model, provider data structures, and/or provider objects, among others, in high-speed access areas relative to user models. Additionally, or alternatively, processor 102 may be configured to start a user session (protected from session hijacking or password sniffers) within digital environment 118, wherein the user session may be automatically terminated (i.e., user may be automatically logged off) the system after a predetermined period of inactivity. Other exemplary techniques apparatus 100 may use to maintain reasonable response time for accessing entities may include, without limitation, implementations of database optimization, asynchronous processing, microservices architecture, and/or the like.

With continued reference to FIG. 1, in some cases, user data 140 may include a user indicator 148. As used in this disclosure, a "user indicator," is a specific data point that describes identify or unique attributes or characteristics of second entity 138. In some cases, modeling user model 136 may include associating user model 136 with corresponding user indicator 148. Similar to provider indicators 110 described above, user indicator 148 may be used, by processor 102, to identify, classify, or otherwise understand second entity 138 within digital environment 118. In an embodiment, user indicator 148 may include geographic indicator related to the physical location of second entity 138. In a non-limiting example, user indictor 148 associated with user model 136 or second entity 138 may include a user address, wherein the user address may include, without limitation, include a name and number of street, a name and/or number of a building, city, state, country, and zone improvement plan (zip) code. For example, and without limitation, user indicator associated with user model 136 may include second entity's 138 mailing or billing address. Additionally, or alternatively, user indicator 148 may include psychographic data describing second entity's 138 attitudes, values, hobbies, lifestyle, and/or the like that give more nuanced insights into second entity's 138 preferences and/or personalities. Other exemplary user indicators consistent with this disclosure may include, without limitation, user device data; for instance, and without limitation, user indicator may indicate information about user device 146. In a non-limiting example, user indicator 148 associated with second entity 138 may include an indicator compiled using information related to operating system, browser type, software version, screen size, and the like of user device 146.

With continued reference to FIG. 1, user data 140 described herein may be received from a data collection unit 150. As used in this disclosure, a "data collection unit" is a component or system that is responsible for gathering, processing, and storing data including, without limitation, provider data 106, user data 140, or any other data described herein. In some cases, data collection unit 150 may be communicatively connected to data store 114. In an embodiment, data collection unit 150 may include a chatbot. For the purposes of this disclosure, "chatbot" is an artificial intelligence (AI) program designed to simulate human conversation or interaction through text or voice-based communication. Chatbot may be programmed to respond to an entity's queries, provide information, or perform specific tasks based on pre-defined rules or machine learning algorithms. In a non-limiting example, chatbot may be programmed to query first entity or second entity to receive provider data 106 or user data 140. The user data 136 received from the chatbot may be stored in a data store 114. Chatbot disclosed herein is further described with reference to FIG. 3.

Still referring to FIG. 1, in such an embodiment, data collection unit 150 may include a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers. punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models In such models, a hidden state to be estimated may include an association between extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, modeling user model 136 may include assigning access level 134 to user model 136 as a function of user data 140. In a non-limiting example, access level 134 may include a "customer" access level, wherein entities at the "customer" access level may be able to browse products or services, make purchase, write reviews, manage account settings, and/or the like; however, modifying any products or services and accessing any administrative features associated with "admin" access level as described above may be beyond the scope of "customer" access level. Additionally, or alternatively, undefined user model 136 such as outside visitor, e.g., entity without a user account may be assigned, by processor 102, a "guest" access level, wherein the "guest" access level may allow associated entities to browse products or services and possibly make purchase; however, entities at "guest" access level may be prohibited from modifying any data (e.g., user data 140) or access any account-specific features. In some cases, processor 102 may apply predefined rules or criteria, or even one or more machine learning process described herein to determine access level 134 based on user data 140. In a non-limiting example, processor 102 may look at user data such as user's purchase histories to determine if entities qualify for a premium access level. Processor 102 may then assign determined access level to user model 136 by updating user data 140 and/or authentication datum associated with user model 136 to reflect new access level.

With continued reference to FIG. 1, processing digital communication 134 includes detecting an action datum 152 targeting at least one proximate provider data structure 154 of at least one provider model 132 from second entity 138. As used in this disclosure, an "action datum" is a piece of data that represents a specific action taken by second entity 138 involving at least an interaction with another party, such as, without limitation, at least one proximate provider data structure 154 of at least one provider model 132. In an embodiment, action datum 154 may include one or more user interactions and/or user commands. Processing digital communication 134 further includes executing action datum 152 as a function user data 140. In some cases, action datum 152 may be detected from digital inquiry 142 as described above; for instance, and without limitation, action datum 152 may include any information describing second entity's 138 input or query encoded within digital inquiry 142. In a non-limiting example, action datum 152 may be incorporated as part of request body data of a network request. Executing such action datum 152 may include a series of steps or actions taken by processor 102, computer programs or applications, or otherwise other components of apparatus to process digital inquiry 142 and respond to detected action datum 152. In some cases, executing action datum 152 may include utilizing one or more APIs through one or more API endpoints, wherein the API endpoints are locations from which APIs can access resources apparatus 100 need to carry out the execution of action datum 152 described herein, for example, and without limitation, URLs of servers or services.

Still referring to FIG. 1, in an embodiment, executing action datum 152 may include identifying the at least a provider object from at least one proximate provider data structure 154 as a function of action datum 152, initializing an object transfer protocol 156 as a function of the user data 140, and executing the object transfer protocol 156 on at least a provider object using at least one proximate provider data structure 154. As used in this disclosure, an "object transfer protocol," refers to a set of rules or conventions that govern the exchange of digital assets, physical assets, or both, including any related information, between two parties, e.g., first entity associated with at least one proximate provider structure 154 and second entity 138 that interacts with at least proximate provider structure 154. In a non-limiting example, user data 140 may further include user payment information. User payment information may include, without limitation, payment method preference, payment history, card information (e.g., card numbers, card security codes, personal identification number [PIN], expiration date, card holder information, card security code [CSC], and the like.), among others. Second entity 138 e.g., customer may click on a listed product or service (i.e., provider object 122) offered by a virtual local store (i.e., at least one proximate provider data structure 154) on the platform (i.e., at least one provider model 132), wherein the click may be detected and considered, by processor 102, as action datum 152 described herein. Such action datum 152 may indicate user's interest in that specific product or service; therefore, object transfer protocol 156 initialized by processor 102 using user data 140 containing user payment information may include, without limitation, an online transaction between customer and the virtual local store regarding selected product or service. In some cases, one or more event handlers linked to at least one proximate provider data structure 154 and/or at least one provider model 132 may be used to detect action data 152 described herein. Exemplary embodiments of event handlers consistent with this disclosure are described in further detail below.

Still referring to FIG. 1, in some cases, at least one proximate provider data structure 154 and/or at least one provider model 132 may include an integration of a payment processing platform, such that object transfer protocol 156 may be executed, by processor 102, using the payment processing platform. A "payment processing platform," for the purpose of this disclosure, is a software or service that facilitates payment transactions between entities. In some cases, the payment processing platform may facilitate payment transactions between at least one proximate provider data structure 154 and user model 136. In other cases, payment processing platform may also facilitate payment transactions between plurality of proximate provider data structures 124 and at least one provider model 132. In a non-limiting example, payment processing platform may be cloud-based; for instance, and without limitation, payment processing platform may include SaaS containing a set of cloud APIs configured for processing object transfer protocols 156 such as online payments. Additionally, or alternatively, the payment processing platform may include integration of a one or more third-party ($3^{rd}$ party) payment processing platforms such as, without limitation, PAYPAL, STRIPE, SQUARE, AUTHORIZE.NET, VENMO, or the like.

With continued reference to FIG. 1, in an embodiment, object transfer protocol 156 may include a protocol modifier 158. As used in this disclosure, a "protocol modifier" is a component or factor that can alter behavior, parameter, or outcomes of execution of object transfer protocol 156 in a specific way. In a non-limiting example, protocol modifier 158 may include a promo code for a provider object discount, which modifies the transaction process by applying the provider object discount to the transaction outcome. A "provider object discount," as described herein, is a reduction in the value, price, or cost of a product or a service that is offered by first entity (e.g., seller) to second entity (e.g., user). In an embodiment, provider object discount may include, without limitation, a product/service discount having a percentage discount, a flat-rate discount, a buy-one-get-one-free offer, a referral discount, a loyalty reward, and/or the like. In some cases, executing object transfer protocol 156 may include generating protocol modifier 158 as a function of user data 140 and applying protocol modifier 158 to the object transfer protocol 156. In a non-limiting example, processor 102 may generate one or more promo codes based on data describing second entity's 138 purchasing behavior, browsing history, demographic information, and/or the like. For frequent buyers, processor 102 may generate a promo code offering a discount on their next purchase as a reward for their loyalty; however, for second entities who haven't made a purchase in a while, processor 102 may generate a promo code offering a significant discount to incentivize them to make a purchase.

Still referring to FIG. 1, in some cases, protocol modifier 158 e.g., promo code may be generated, using a random code generation algorithm or function, as a set of characters (e.g., letters, numbers, symbols) based on a predetermined format and structure such as length, specific patterns, or rules. In an embodiment, applying protocol modifier 158 may include validating protocol modifier 158; for instance, and without limitation, processor 102 may be configured to check protocol modifier 158 is already in use or if it violates any restrictions or limitations, such as usage limits or expiration dates, thereby ensuring protocol modifier 158 is valid and may be used by user model 136. Additionally, or alternatively, protocol modifier 158 may be stored and/or retrieved from data store 114. Further processor 102 may be configured to associate protocol modifier 158 with one or more provider object discounts and deliver protocol modifier 158 to user model 136 through digital communication 134 such as, without limitation, email, social media, txt message, and/or the like.

With continued reference to FIG. 1, in a non-limiting example, provider data 106 may include one or more predefined protocol modifiers. Plurality of first entities 108 may manually input provider object discounts and provide predefined protocol modifiers associated with input provider object discounts to user model 136 associated with second entity 138. In another non-limiting example, the protocol modifier 158 may be automatically generated as a function of user data 140. Processor 102 may generate protocol modifier 158 using a machine learning model such as, without limitation, a protocol modifier machine learning model 160, wherein the protocol modifier machine learning model 160 may be generated using machine learning module 128 as described above. In some cases, protocol modifier machine learning model 160 may be trained with protocol modifier training data. Protocol modifier training data may correlate a plurality of user data to a plurality of protocol modifiers including a plurality of provider object discounts. In a non-limiting example, when user data includes a behavioral pattern such as "frequently buying," a protocol modifier associated with a relatively lower provider object discount (e.g., 15% off) may be correlated to such user data. In another non-limiting example, when user data includes a behavioral pattern such as "returned customer," a protocol modifier associated with a relatively higher provider data discount (e.g., 50% off) may be correlated to such user data. In some cases, protocol modifier training data may be received from one or more plurality of first entities 108, second entity 138, data store 114, external computing devices, and/or previous iterations of processing. Generating protocol modifier 158 may include generating protocol modifier 158 using trained protocol modifier machine learning model 160 as a function of user data 140.

Additionally, or alternatively, and still referring to FIG. 1, other exemplary embodiments of manipulating object transfer protocol 158 during execution of object transfer protocol 156 may include, without limitation, (manually or automatically) booking execution of object transfer protocol 156, duplicating executed object transfer protocol 156 (i.e., duplicate order), exporting executed object transfer protocol 156 (i.e., sharing information related to object transfer protocol 158 with other entities), annotating executed object transfer protocol 156 (i.e., modifying order information such as order description, order name, and/or the like), terminating object transfer protocol execution, changing/switching protocol modifier 158 of object transfer protocol 156 being executed, and/or the like.

With continued reference to FIG. 1, executing action datum 152 may further include determining a relation datum 162 as a function of provider indicator associated with at least one proximate provider data structure 154 and user indicator 148, selecting at least one execution dispatcher agent 164 from a plurality of execution dispatcher agents 166 characterized by plurality of provider indicators 110 as a function of the relation datum 162, and executing action datum 152 using the at least one execution dispatcher agent 164. As used in this disclosure, a "relation datum" is a piece of information that represents a relationship or association between user model 136 and at least one proximate provider data structure 154 based on their respective indicators. In some cases, relation datum 162 may indicate a provider/seller-user relationship. In an embodiment, relation datum 162 may provide insights into how closely matched second entity 138 and one or more first entities are, how deeply user model 136 is to be connected to one or more proximate provider data structures within at least one provider model 132, or how likely second entity 138 is to be interested in one or more first entities/offerings. In a non-limiting example, if a user's location (i.e., user indicator 148) is the same as a user interested provider's or seller's location (i.e., provider indicator) then relation datum 162 determined by processor 102 may include a data element describing user model 136 and at least one proximate provider data structure 154 is "geographically matched" or a quantitative measurement such as a travel distance (in miles) indicating a geographic relationship between the user and the provider or the seller. It should be noted that, in some cases, relation datum 162 may be changed over time as user and provider indicators changed. For example, and without limitation, if second entity 138 moves to a new location, their relation datum 162 with plurality of first entities 108 may be updated by processor 102.

Still referring to FIG. 1, as described herein, an "execution dispatcher agent" refers to a component that is responsible for carrying out specific actions or tasks based on criteria or instructions. In an embodiment, at least one execution dispatcher agent 164 may act as an intermediary connecting the request for an action (i.e., action datum 152) with resources or components available in digital environment 118 that can execute the action. In some cases, execution dispatcher agent may include a software program or a computer module. In other cases, at least one execution dispatcher agent 164 may include an entity in physical environment designated to carry out the execution of actions or tasks such as, without limitation, processing transactions, sending messages, updating data store 114, and/or the like. In a non-limiting example, at least one execution dispatcher agent 164 may include an entity or mechanism responsible for managing and executing the final steps of a delivery or service process, ensuring the correct and timely delivery of provider objects being transferred (specified in object transfer protocol 156) such as ordered product or services to second entity 138 (e.g., customer) in real world. In some cases, plurality of execution dispatcher agents 166 may be characterized based on plurality of provider indicators 110 or user indicators 148. In an embodiment, an execution dispatcher agent characterized by a specific provider indicator might be chosen to execute actions related to a proximate provider data structure associated with the specific provider indicator.

In a non-limiting example, and still referring to FIG. 1, selecting at least one execution dispatcher agent 164 from plurality of execution dispatcher agents 166 may include selecting at least one execution dispatcher agent 164 based on geographic areas, types of products or service being delivered, capacity of delivery resources, and/or the like. Processor 102 may assign at least one execution dispatcher agent which is closest to the physical store and/or delivery address to handle the actual delivery of product or service. Additionally, or alternatively, selecting at least one execution dispatcher agent 164 may include selecting at least one execution dispatcher agent 164 as a function of a plurality of user inputs. Plurality of user inputs may include inputs from second entity 138. In some cases, second entity 138 may input plurality of user inputs through digital inquiry 142 as described above. In other cases, a plurality of user inputs may be retrieved from data store 114 (e.g., preferred parameters for execution dispatcher agent selection). In a non-limiting example, plurality of user inputs used by processor 102 to select at least one execution dispatcher agent 164 from plurality of execution dispatcher agents 166 may include user-selected delivery slots, shipping methods, delivery options (e.g., express delivery, free delivery, local delivery, or pickup), and/or the like.

With continued reference to FIG. 1, processor 102 may be configured to select at least one execution dispatcher agent 164 from plurality of execution dispatcher agent 166 using machine learning model such as, without limitation, agent selection machine learning model 168. Selecting at least one execution dispatcher agent 164 may include receiving execution dispatcher agent training data, wherein the execution dispatcher agent training data may include a plurality of relation datums as input correlated to a plurality of execution dispatcher agents as output. In some cases, execution dispatcher agent training data may be received from data store 114. In other cases, execution dispatcher agent training data may be received from plurality of first entities 108 and second entities 138 communicate with plurality of first entities 108. In an embodiment, receiving execution dispatcher agent training data may include aggregating provider data 106 and user data 140 and correlating one or more execution dispatcher agents to the data aggregates. For example, and without limitation, execution dispatcher agent training data may be used to show user indicator and/or provider indicator may indicate a particular execution dispatcher agent selected by processor 102 for executing action datum 152. Agent selection machine learning model 168 may be trained, by processor 102, using execution dispatcher agent training data. Additionally, execution dispatcher agent training data may include previously input execution dispatcher agent data sets and their corresponding classification output. Agent selection machine learning model 168 may be iterative such that outputs may be used as future inputs of agent selection machine learning model 168. This may allow the agent selection machine learning model 168 to evolve. Processor 102 may be further configured to select at least one execution dispatcher agent 164 from plurality of execution dispatcher agent 166 as a function of user indicator 148 using the trained agent selection machine learning model 168.

With continued reference to FIG. 1, processor 102 is configured to generate a provider landscape 170 as a function of the execution of the action datum 152. For the purposes of this disclosure, a "provider landscape" is an analysis of plurality of first entities 108 offering products or services, and the dynamics between them. In an embodiment, provider landscape 170 may include an analysis regarding all the provider data structures of plurality of provider models 116 and corresponding provider data 106 such as, without limitation, each first entity's size, reputation, pricing, location, sales, performance, and other relevant factors. In another embodiment, provider landscape 170 may include first entities within a particular geographic area (i.e., first entities sharing a common provider indicator). As a non-limiting example, provider landscape 170 may include analysis on sellers and/or service providers within the same state, same zip code, same country, or the like. In some cases, generating provider landscape 170 may include generating a heat map. For example, and without limitation, heat map generated by processor 102 may include a color coding, where an area that includes first entities that are most popular among second entities (e.g., provider data structures with highest activity or greatest number of digital communications within digital environment 118) is colored in red and another area that includes first entities that are less popular among second entities (e.g., provider data structures with lowest activity or least number of digital communications within digital environment 118 is colored in green. In some cases, processor 102 may generate a graph that analyzes provider data 106 of one or more first entities sharing a common provider indicator. For example, and without limitation, the provider landscape may include a graph that analyzes service costs or product price offered to customers by service providers or sellers that are located within a same geographic area. The graph, in a non-limiting example, may display one or more relationships between entities within same community such as seller-buyer relationship, provider-client relationship, vendor-retailer relationship, third-party relationship, and/or the like.

Still referring to FIG. 1, in an embodiment, provider landscape 170 may include one or more statistical reports of provider object related information. In a non-limiting example, statistical reports may include data describing recent transactions, monthly sale of each products/services, popular product/services SKU, and/or the like. Such statistical reports may also include customer reports containing data describing, for example, common payment methods used by the customers, number of customers overtime, returning customers, online customers, and/or the like. In some cases, processor 102 may be configured to receive or calculate one or more measurements regarding sales of provider objects (e.g., products or services), such as total revenue, total units sold, active stores, unique purchases, among others. In some cases, provider landscape 170 may include one or more visualization for such statistical reports; for instance, and without limitation, visualization may include, without limitation, image of delivered product or received service, statistical graph, chart, and table visualizing measurements described herein. In a non-limiting example, provider landscape 170 generated by processor 102 may include a line graph depicting total revenue for the previous week, month, quarter, or year of a given provider model and/or plurality of integrated proximate provider data structures 124. Persons skilled in the art, upon reviewing the entirety of this disclosure, may appreciate the various provider landscapes that can be generated.

With continued reference to FIG. 1, provider landscape 170 may be generated, by processor 102, per first entity's request. In some cases, first entity associated with certain access level may be able to generate, view, and/or manipulate provider landscape 170. In a non-limiting example, provider landscape 170 may include an on-demand or subscription-based (e.g., weekly, bi-weekly, monthly, or yearly) seller or vendor report that can only be accessed by first entity at "admin" access level. Processor 102 may be configured to generate provider landscape 170 using machine learning model such as, without limitation, provider landscape generation machine learning model 172. Provider landscape generation machine learning model 172 may be trained using training data, such as provider landscape training data. In some cases, provider landscape training data may be received from data store 114. In an embodiment, provider landscape training data may include a plurality of provider data and user data correlated to a plurality of provider landscape. Processor 102 may be configured to generate provider landscape 170 using the trained provider landscape generation machine learning model 170.

With continued reference to FIG. 1, processor may be configured to display provider landscape 170 to plurality of first entities 108 using a visual interface 174. A "visual interface," as used in this disclosure, is a graphical user interface (GUI) that conveys information and facilitates interaction between users and apparatus 100. In an embodiment, visual interface 174 may display provider data 106, user data 140, provider landscape 170, and any data described herein to plurality of first entities 108 of a remote device e.g., provider device 112, and permits plurality of first entities 108 to manipulate, edit, or otherwise interact with displayed. In an embodiment, visual interface 174 may include a window in which provider landscape 170 may be displayed. In some cases, visual interface 172 may include one or more graphical locator and/or cursor facilities allowing plurality of first entities 108 to interact with provider landscape 170; for instance, and without limitation, using a touchscreen, touchpad, mouse, keyboard, and/or other manual data entry device. In some cases, visual interface 170 may include one or more menus and/or panels permitting selection of measurements, models, visualization of data to be displayed and/or used, elements of data, functions, or other aspects of provider landscape 170 to be edited, added, and/or manipulated, options for importation of and/or linking to application programmer interfaces (APIs), exterior services, data source, machine-learning models, and/or algorithms, or the like. Persons skilled in the art, upon reviewing the entirety of this disclosure, will be aware of various ways in which visual interface 174 and/or elements thereof may be implemented and/or used as described in this disclosure.

In one or more embodiments, and still referring to FIG. 1, visual interface 174 may include one or more user input fields. For example, and without limitation, As used in this disclosure, an "user input field" is a graphical or interactive element in GUI that allows entities to input or enter data. In some cases, user input fields may be configured to receive user input containing provider data 106, user data 140, and/or any other data described herein. In a non-limiting example, user input fields may include, without limitation, a text box, a dropdown menu, a checkbox, a radio button, and/or any other interactive components that allows entities to provide any data described herein. In some cases, user input field may include an event handler that responds to user interactions, wherein the "event handler," for the purpose of this disclosure, is a piece of computer program or software function that is associated with a specific event. In some cases, the event handler may be configured to detect action datum 152 from digital inquiry 142 initiated by user model 136 as described above. Additionally, or alternatively, event handler may generate prompts for further information, may compare data to validation rules such as requirements that the data in question be entered within certain numerical ranges, and/or may modify data and/or generate warnings to entities in response to such requirements. Further, event handler may convert data into expected and/or desired formats, for instance such as date formats, currency entry formats, name formats, or the like.

Figure 2:
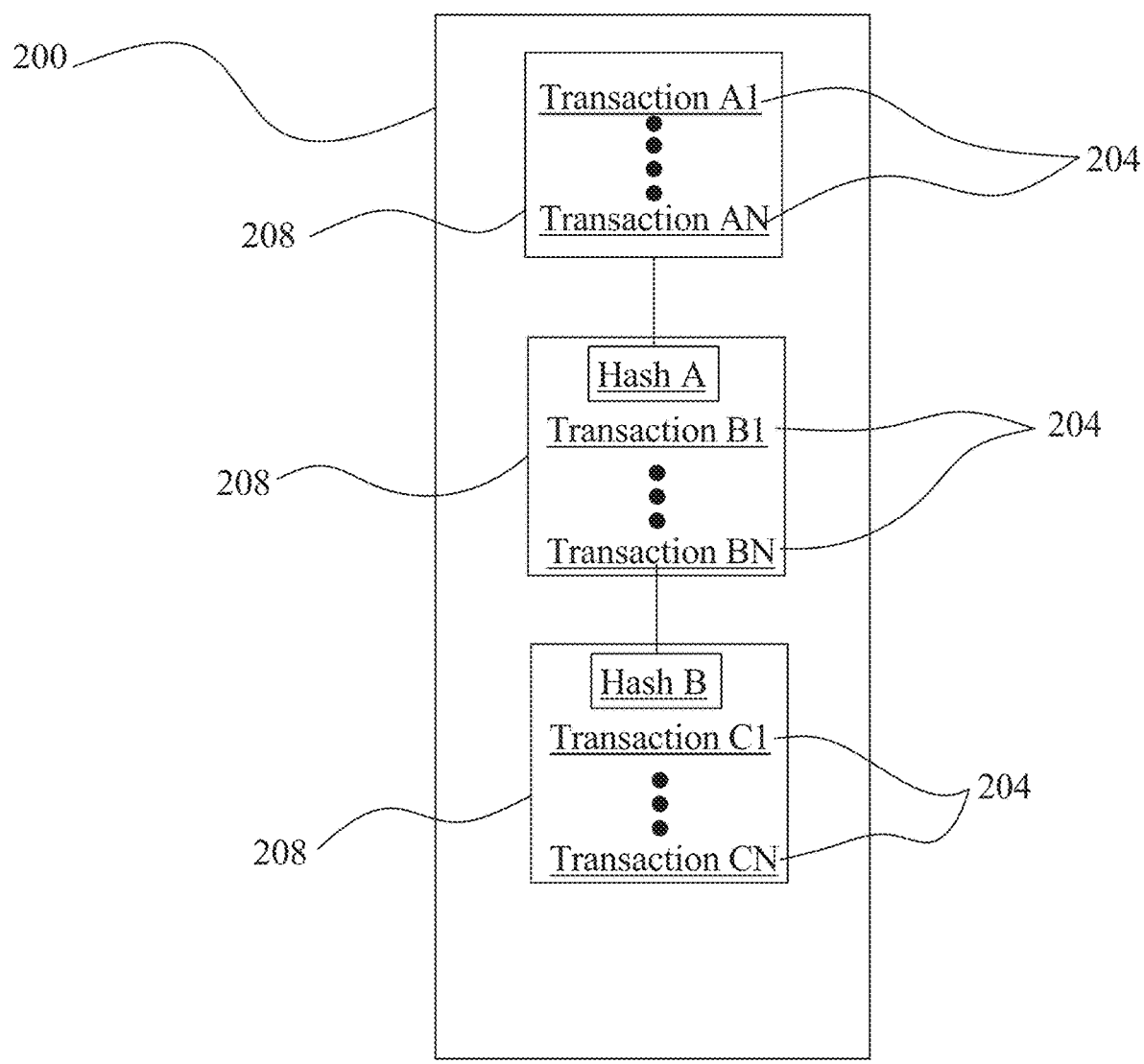
FIG. 2 an exemplary embodiment of an immutable sequential listing.

Referring now to FIG. 2, an exemplary embodiment of an immutable sequential listing 200 is illustrated. An immutable sequential listing may be, include and/or implement an immutable ledger, where data entries that have been posted to the immutable sequential listing cannot be altered. Data elements are listing in immutable sequential listing 200; data elements may include any form of data, including textual data, image data, encrypted data, cryptographically hashed data, and the like. Data elements may include, without limitation, one or more at least a digitally signed assertion. In one embodiment, a digitally signed assertion 204 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 2, a digitally signed assertion 204 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine (e.g., a ride share vehicle or any other asset). Digitally signed assertion 204 may describe the transfer of a physical good; for instance, a digitally signed assertion 204 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 2, in one embodiment, an address is a textual datum identifying the recipient of virtual currency or another item of value in a digitally signed assertion 204. In some embodiments, address is linked to a public key, the corresponding private key of which is owned by the recipient of a digitally signed assertion 204. For instance, address may be the public key. An address may be a representation, such as a hash, of the public key. Address may be linked to the public key in memory of a computing device, for instance via a "wallet shortener" protocol. Where address is linked to a public key, a transferee in a digitally signed assertion 204 may record a subsequent a digitally signed assertion 204 transferring some or all of the value transferred in the first a digitally signed assertion 204 to a new address in the same manner. Digitally signed assertion 204 may contain textual information that is not a transfer of some item of value in addition to, or as an alternative to, such a transfer. For instance, as described in further detail below, a digitally signed assertion 204 may indicate a confidence level associated with a distributed storage node as described in further detail below.

In an embodiment, and still referring to FIG. 2 immutable sequential listing 200 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 200 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 2, immutable sequential listing 200 may preserve the order in which the at least a posted content took place by listing them in chronological order; alternatively or additionally, immutable sequential listing 200 may organize digitally signed assertions 204 into sub-listings 208 such as "blocks" in a blockchain, which may be themselves collected in a temporally sequential order; digitally signed assertions 204 within a sub-listing 208 may or may not be temporally sequential. The ledger may preserve the order in which at least a posted content took place by listing them in sub-listings 208 and placing the sub-listings 208 in chronological order. The immutable sequential listing 200 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 200 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 2, immutable sequential listing 200, once formed, may be inalterable by any party, no matter what access rights that party possesses. For instance, immutable sequential listing 200 may include a hash chain, in which data is added during a successive hashing process to ensure non-repudiation. Immutable sequential listing 200 may include a block chain. In one embodiment, a block chain is immutable sequential listing 200 that records one or more new at least a posted content in a data item known as a sub-listing 208 or "block." An example of a block chain is the BITCOIN block chain used to record BITCOIN transactions and values. Sub-listings 208 may be created in a way that places the sub-listings 208 in chronological order and link each sub-listing 208 to a previous sub-listing 208 in the chronological order so that any computing device may traverse the sub-listings 208 in reverse chronological order to verify any at least a posted content listed in the block chain. Each new sub-listing 208 may be required to contain a cryptographic hash describing the previous sub-listing 208. In some embodiments, the block chain contains a single first sub-listing 208 sometimes known as a "genesis block."

Still referring to FIG. 2, the creation of a new sub-listing 208 may be computationally expensive; for instance, the creation of a new sub-listing 208 may be designed by a "proof of work" protocol accepted by all participants in forming the immutable sequential listing 200 to take a powerful set of computing devices a certain period of time to produce. Where one sub-listing 208 takes less time for a given set of computing devices to produce the sub-listing 208 protocol may adjust the algorithm to produce the next sub-listing 208 so that it will require more steps; where one sub-listing 208 takes more time for a given set of computing devices to produce the sub-listing 208 protocol may adjust the algorithm to produce the next sub-listing 208 so that it will require fewer steps. As an example, protocol may require a new sub-listing 208 to contain a cryptographic hash describing its contents; the cryptographic hash may be required to satisfy a mathematical condition, achieved by having the sub-listing 208 contain a number, called a nonce, whose value is determined after the fact by the discovery of the hash that satisfies the mathematical condition. Continuing the example, the protocol may be able to adjust the mathematical condition so that the discovery of the hash describing a sub-listing 208 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 208 according to the protocol is known as "mining." The creation of a new sub-listing 208 may be designed by a "proof of stake" protocol as will be apparent to those skilled in the art upon reviewing the entirety of this disclosure.

Continuing to refer to FIG. 2, in some embodiments, protocol also creates an incentive to mine new sub-listings 208. The incentive may be financial; for instance, successfully mining a new sub-listing 208 may result in the person or entity that mines the sub-listing 208 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 208 Each sub-listing 208 created in immutable sequential listing 200 may contain a record or at least a posted content describing one or more addresses that receive an incentive, such as virtual currency, as the result of successfully mining the sub-listing 208.

With continued reference to FIG. 2, where two entities simultaneously create new sub-listings 208, immutable sequential listing 200 may develop a fork; protocol may determine which of the two alternate branches in the fork is the valid new portion of the immutable sequential listing 200 by evaluating, after a certain amount of time has passed, which branch is longer. "Length" may be measured according to the number of sub-listings 208 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 208 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 200 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 200.

Still referring to FIG. 2, additional data linked to at least a posted content may be incorporated in sub-listings 208 in the immutable sequential listing 200; for instance, data may be incorporated in one or more fields recognized by block chain protocols that permit a person or computer forming a at least a posted content to insert additional data in the immutable sequential listing 200. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 2, in some embodiments, virtual currency is traded as a cryptocurrency. In one embodiment, a cryptocurrency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Cryptocurrency may be centralized, with its protocols enforced or hosted by a particular entity. For instance, cryptocurrency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 208 in a block chain computationally challenging; the incentive for producing sub-listings 208 may include the grant of new cryptocurrency to the miners. Quantities of cryptocurrency may be exchanged using at least a posted content as described above.

Figure 3:
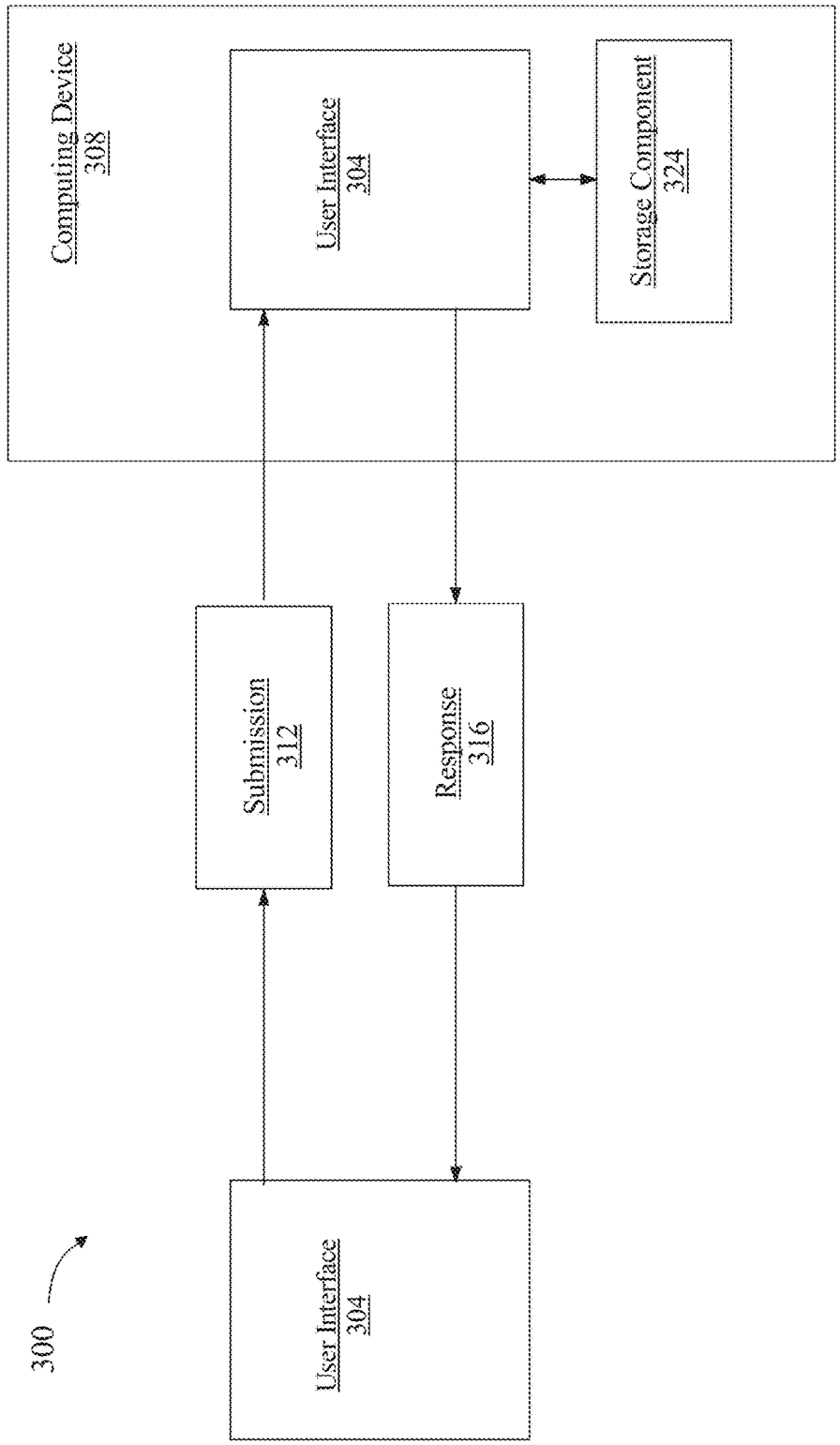
FIG. 3 is a block diagram of a chatbot system.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor 320. In some embodiments, processor 320 processes a submission 3112 using one or more of keyword recognition, pattern matching, and natural language processing. In some embodiments, processor 320 employs real-time learning with evolutionary algorithms. In some cases, processor 320 may retrieve a pre-prepared response from at least a storage component 324, based upon submission 312. Alternatively or additionally, in some embodiments, processor 320 communicates a response 316 without first receiving a submission 312, thereby initiating conversation. In some cases, processor 320 communicates an inquiry to user interface 304; and the processor is configured to process an answer to the inquiry in a following submission 312 from the user interface 304. In some cases, an answer to an inquiry presented within a submission 312 from a user device 304 may be used by computing device 104 as an input to another function, for example without limitation at least a feature 108 or at least a preference input 112.

Figure 4:
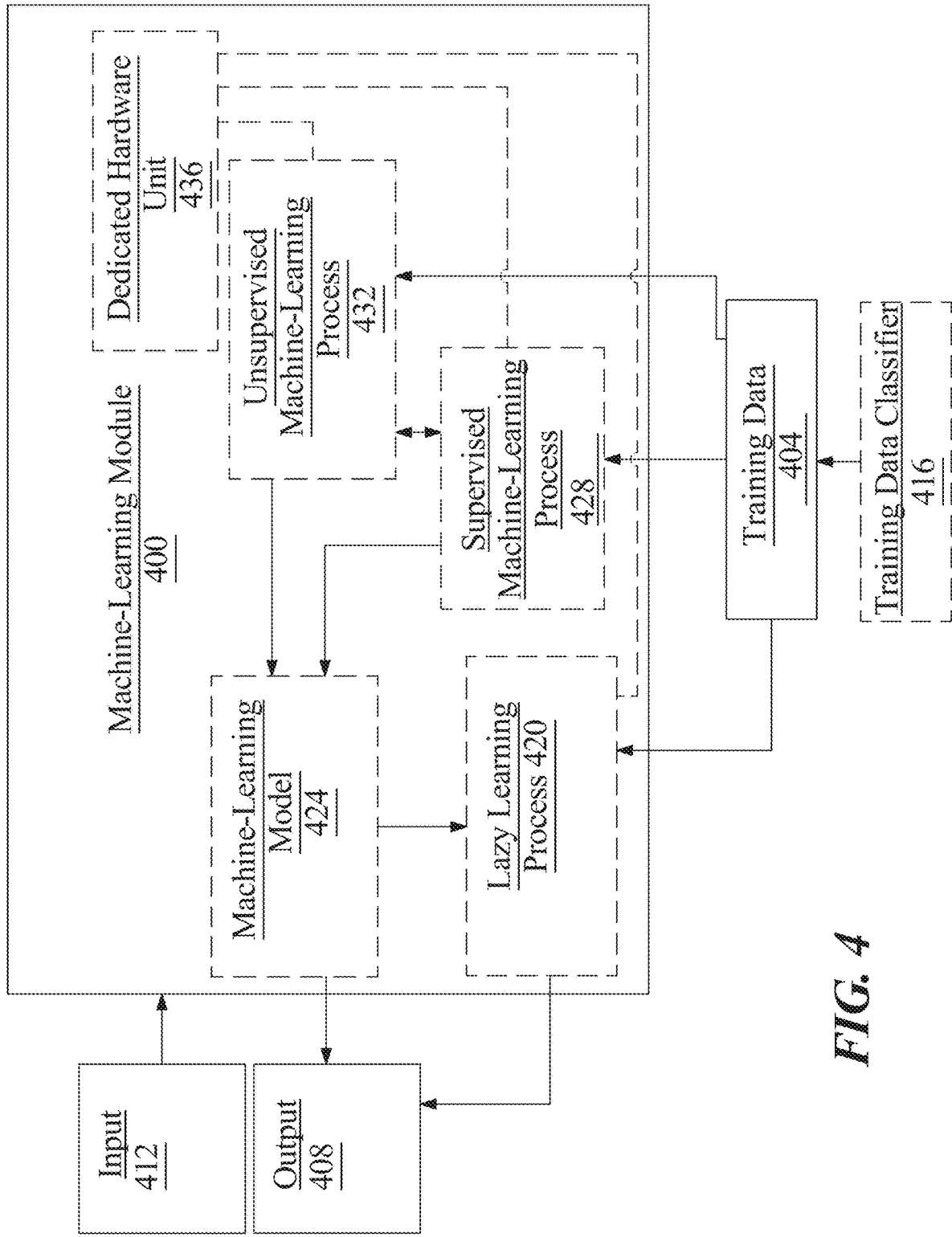
FIG. 4 is a block diagram of an exemplary embodiment of a machine learning process.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, training data may include a plurality of provider indicator groups (i.e., a set of provider indicators) that each correlated to a plurality of proximate provider indicator groups (i.e., a set of provider indicators that are proximate to each other).

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to plurality of proximate provider indicator groups as described above in this disclosure.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include plurality of provider indicator groups as described above as inputs, a plurality of proximate provider indicator groups as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
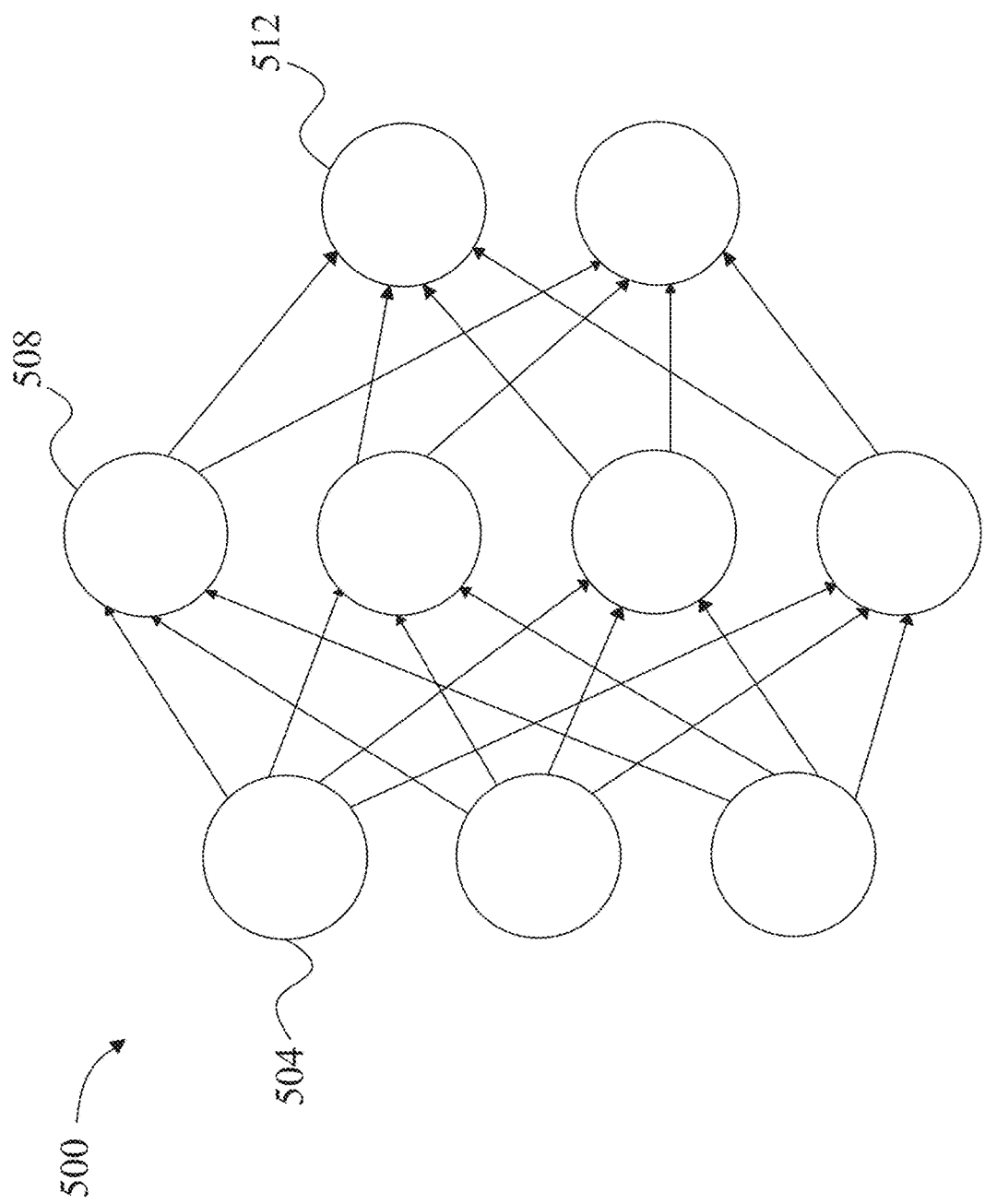
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
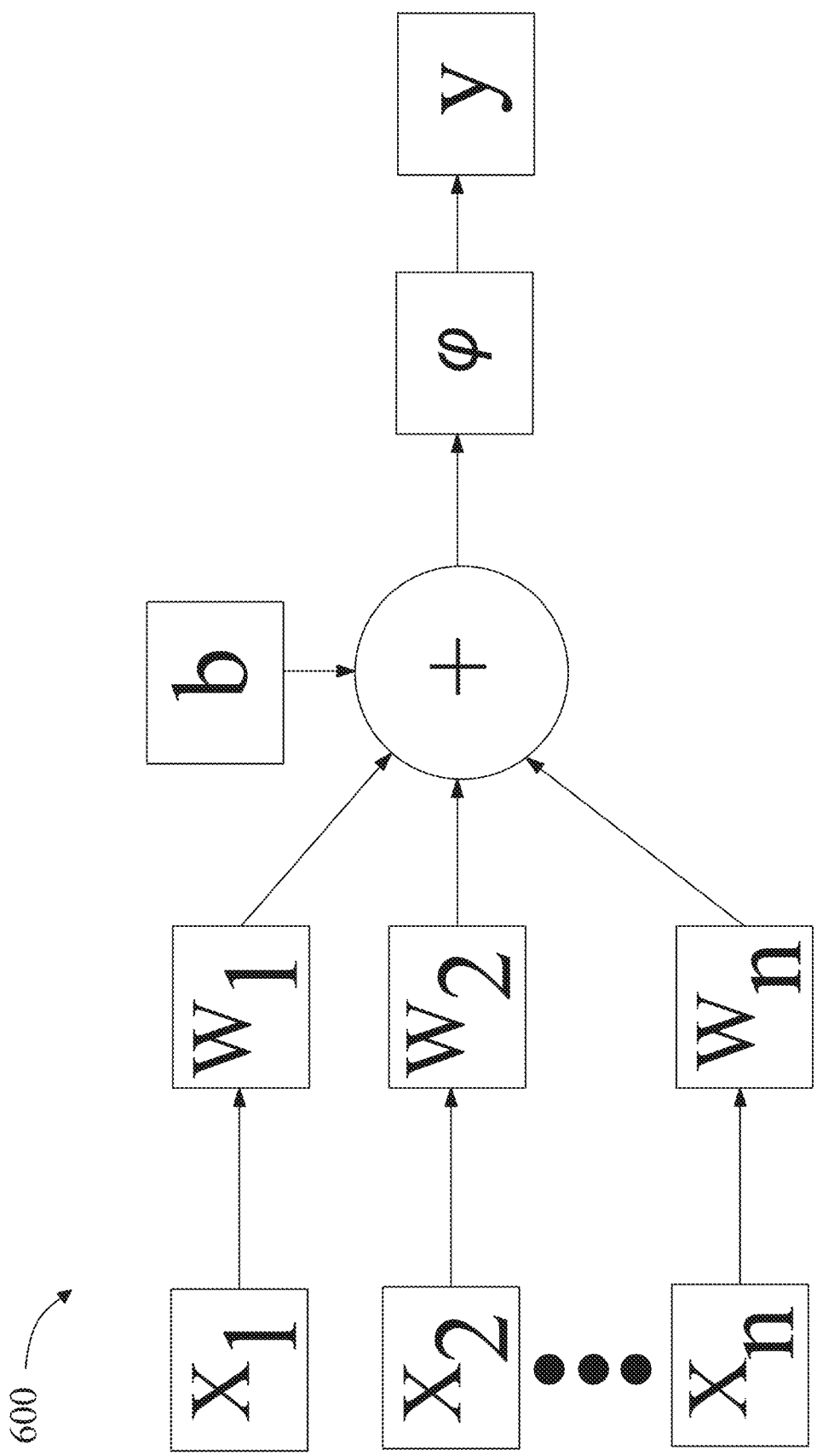
FIG. 6 is a diagram of an illustrative embodiment of a node of a neural network.

Referring now to FIG. 6, an exemplary embodiment of a node 600 of a neural network is illustrated. A node may include, without limitation, a plurality of inputs x, that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs x, that may be used as activation functions. A node may include, without limitation, a plurality of inputs x, that may receive numerical values from inputs to a neural network containing the node and/or from other nodes. Node may perform a weighted sum of inputs using weights w, that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input x, may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w, may be determined by training a neural network using training data, which may be performed using any suitable process as described above.

Figure 7:
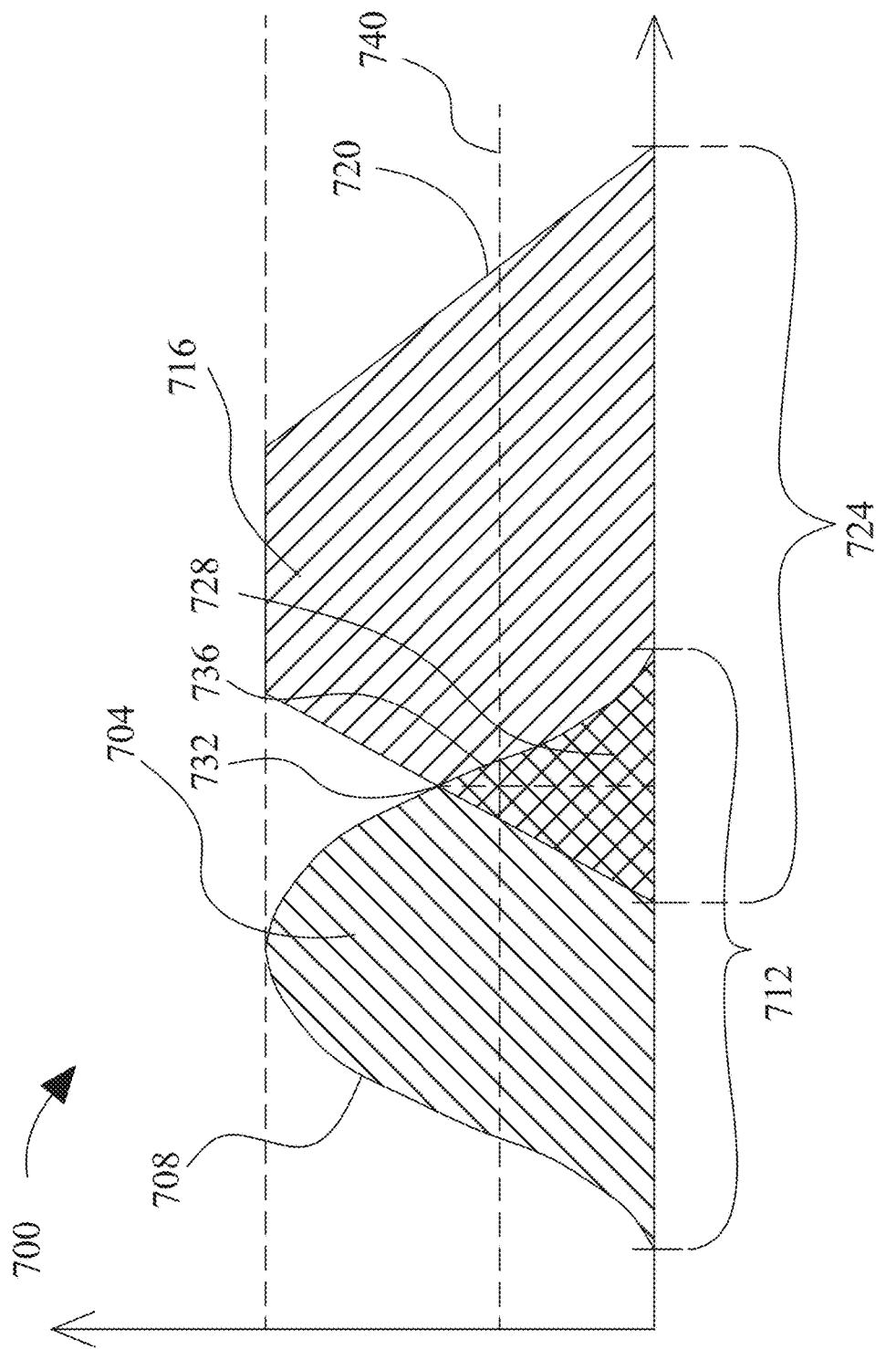
FIG. 7 is a graph illustrating an exemplary relationship between fuzzy sets.

Referring now to FIG. 7, an exemplary embodiment of fuzzy set comparison 700 is illustrated. A first fuzzy set 704 may be represented, without limitation, according to a first membership function 708 representing a probability that an input falling on a first range of values 712 is a member of the first fuzzy set 704, where the first membership function 708 has values on a range of probabilities such as without limitation the interval [0,1], and an area beneath the first membership function 708 may represent a set of values within first fuzzy set 704. Although first range of values 712 is illustrated for clarity in this exemplary depiction as a range on a single number line or axis, first range of values 712 may be defined on two or more dimensions, representing, for instance, a Cartesian product between a plurality of ranges, curves, axes, spaces, dimensions, or the like. First membership function 708 may include any suitable function mapping first range 712 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 7, first fuzzy set 704 may represent any value or combination of values as described above, including output from one or more machine-learning models. A second fuzzy set 716, which may represent any value which may be represented by first fuzzy set 704, may be defined by a second membership function 720 on a second range 724; second range 724 may be identical and/or overlap with first range 712 and/or may be combined with first range via Cartesian product or the like to generate a mapping permitting evaluation overlap of first fuzzy set 704 and second fuzzy set 716. Where first fuzzy set 704 and second fuzzy set 716 have a region 728 that overlaps, first membership function 708 and second membership function 720 may intersect at a point 732 representing a probability, as defined on probability interval, of a match between first fuzzy set 704 and second fuzzy set 716. Alternatively, or additionally, a single value of first and/or second fuzzy set may be located at a locus 736 on first range 712 and/or second range 724, where a probability of membership may be taken by evaluation of first membership function 708 and/or second membership function 720 at that range point. A probability at 728 and/or 732 may be compared to a threshold 740 to determine whether a positive match is indicated. Threshold 740 may, in a non-limiting example, represent a degree of match between first fuzzy set 704 and second fuzzy set 716, and/or single values therein with each other or with either set, which is sufficient for purposes of the matching process; for instance, threshold may indicate a sufficient degree of overlap between an output from one or more machine-learning models. Alternatively, or additionally, each threshold may be tuned by a machine-learning and/or statistical process, for instance and without limitation as described in further detail below.

Figure 8:
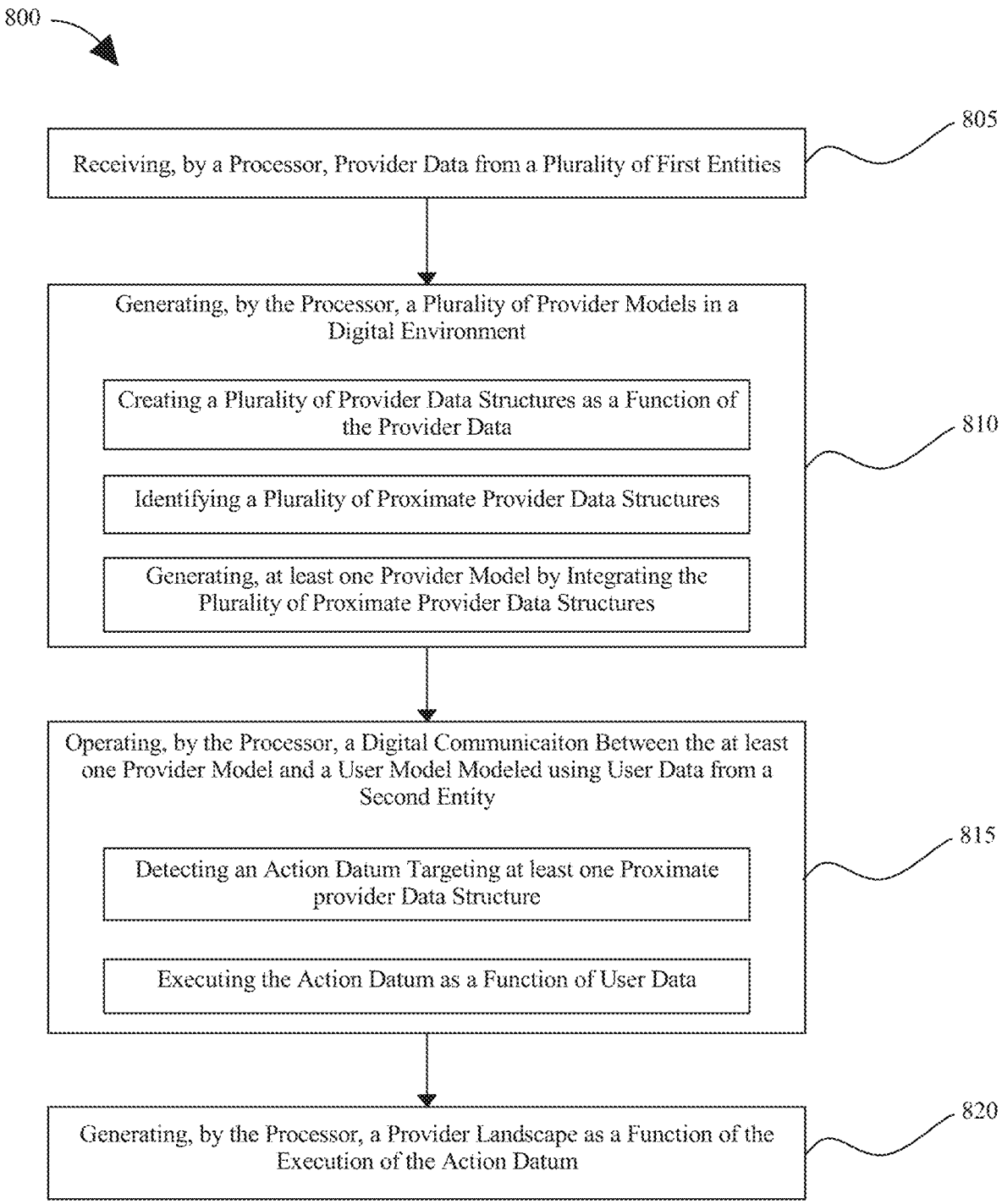
FIG. 8 is a flow diagram of an exemplary method for integrating a plurality of proximate provider data structures.

Now referring to FIG. 8, a flow diagram of an exemplary method 800 for integrating a plurality of proximate provider data structures in a digital environment is illustrated. Method 800 includes step 805 of receiving, by at least a processor, provider data from a plurality of first entities, wherein provider data includes a plurality of provider indicators associated with the plurality of first entities. This may be implemented, without limitation, as described above with reference to FIGS. 1-7.

With continued reference to FIG. 8, method 800 includes a step 810 of generating, by the at least a processor, a plurality of provider models in a digital environment, wherein generating the plurality of provider models includes creating a plurality of provider data structures as a function of the provider data, wherein each provider data structure of the plurality of provider data structures is associated with at least one first entity of the plurality of first entities, identifying a plurality of proximate provider data structures according to the plurality of provider indicators, and generating at least one provider model by integrating the plurality of proximate provider data structures. In some embodiments, each provider data structure of the plurality of provider data structure may include at least a provider object. In some embodiments, identifying the plurality of proximate provider data structures may include comparing each provider indicator of the plurality of provider indicators against a reference indicator, and identifying the plurality of proximate provider data structure as a function of the comparison of the plurality of provider indicators and the reference indicator. In some embodiments, executing the action datum may include identifying the at least a provider object from the at least one proximate provider data structure as a function of the action datum, initializing an object transfer protocol as a function of the user data, and executing the object transfer protocol on the at least a provider object using the at least one proximate provider data structure. In some embodiments, integrating the plurality of proximate provider data structures may include linking the plurality of proximate provider data structures to the at least one provider model. This may be implemented, without limitation, as described above with reference to FIGS. 1-7.

With continued reference to FIG. 8, method 800 includes a step 815 of operating, by the at least a processor, a digital communication between the at least one provider model and a user model modeled using user data from a second entity in the digital environment, wherein operating the digital communication includes detecting an action datum targeting at least one proximate provider data structure of the at least one provider model from the second entity and executing the action datum as a function the user data. In some embodiments, user data may be received through a data collection unit containing a language processing module. In some embodiments, the user data may include a user indicator. In some embodiments, executing the action datum may include determining a relation datum as a function of a provider indicator associated with the at least one proximate provider data structure and the user indicator, selecting at least one execution dispatcher agent from a plurality of execution dispatcher agent characterized by the plurality of provider indicators as a function of the relation datum, and executing the action datum using the at least one execution dispatcher agent. In some embodiments, selecting the at least one execution dispatcher agent may include training an agent selection machine learning model using execution dispatcher agent training data, wherein the execution dispatcher agent training data contains a plurality of relation datums as input correlated to a plurality of execution dispatcher agents as output, and selecting the at least one execution dispatcher agent as a function of the user indicator using the agent selection machine learning model. This may be implemented, without limitation, as described above with reference to FIGS. 1-7.

With continued reference to FIG. 8, method 800 includes step 820 of generating, by the at least a processor, a provider landscape as a function of the execution of the action datum. This may be implemented, without limitation, as described above with reference to FIGS. 1-7.

With continued reference to FIG. 8, method 800 may further include a step of displaying, using a visual interface, the provider landscape to the plurality of first entities. This may be implemented, without limitation, as described above with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
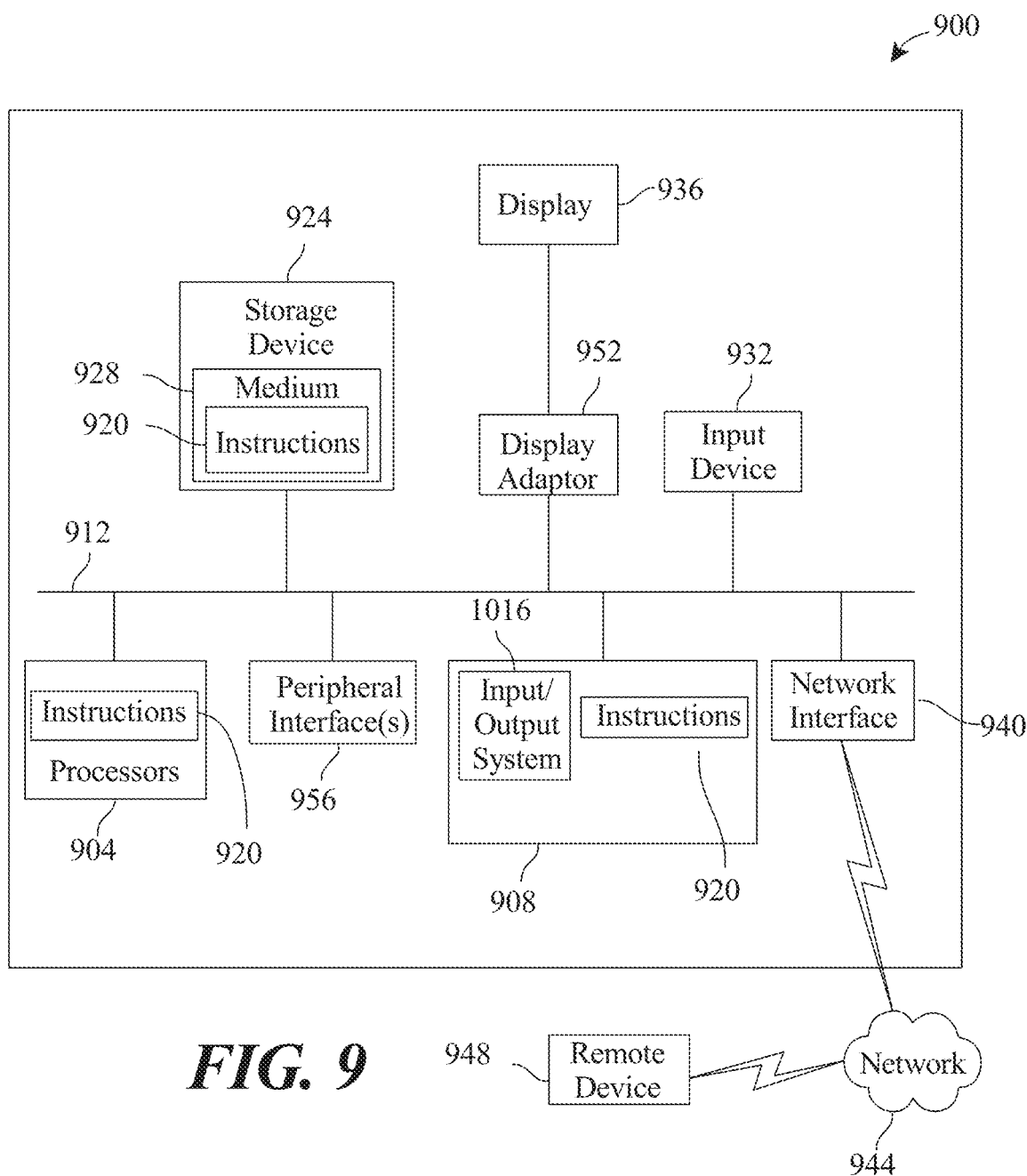
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIRE-WIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for integrating a plurality of proximate provider data structures in a digital environment, the apparatus comprising:
   at least a processor; and
   a memory communicatively connected to the at least a processor, wherein the memory contains instructions configuring the at least a processor to:
      receive provider data from a plurality of first entities, wherein the provider data comprises a plurality of provider indicators associated with the plurality of first entities;
      generate a plurality of provider models in a digital environment, wherein generating the plurality of provider models comprises:
         creating a plurality of provider data structures as a function of the provider data, wherein each provider data structure of the plurality of provider data structures is associated with at least one first entity of the plurality of first entities;
         identifying a plurality of proximate provider data structures as a function of the plurality of provider indicators using a provider data structure classifier, wherein at least one proximate provider data structure of the plurality of proximate provider data structures comprises a target market proximate provider data structure, wherein identifying the plurality of proximate provider data structures comprises determining a proximity score for each provider data structure of the plurality of provider data structures; and wherein the proximity score is updated in real-time as the at least a processor iterates through the plurality of provider data structures;
         generating at least one provider model by integrating the plurality of proximate provider data structures; and
         generating at least one subscription model, wherein the at least one subscription model is a provider model configured to allow an authorized user within the digital environment to interact with the provider model via an authentication datum;
      operate a digital communication between the at least one provider model and a user model modeled using user data from a second entity in the digital environment, wherein operating the digital communication comprises: detecting an action datum targeting at least one proximate provider data structure of the at least one provider model as a function of the second entity; and
         executing the action datum as a function of the user data; and
      generate a provider landscape as a function of the execution of the action datum.

2. The apparatus of claim 1, wherein each provider data structure of the plurality of provider data structures comprises at least a provider object.

3. The apparatus of claim 1, wherein identifying the plurality of proximate provider data structures comprises:
comparing each provider indicator of the plurality of provider indicators against a reference indicator; and
identifying the plurality of proximate provider data structures as a function of the comparison of the plurality of provider indicators and the reference indicator.

4. The apparatus of claim 1, wherein integrating the plurality of proximate provider data structures comprises linking the plurality of proximate provider data structures to the at least one provider model.

5. The apparatus of claim 1, wherein the user data is received through a data collection unit comprising a language processing module.

6. The apparatus of claim 1, wherein executing the action datum comprises:
identifying at least a provider object from the at least one proximate provider data structure as a function of the action datum;
initializing an object transfer protocol as a function of the user data; and
executing the object transfer protocol on the at least a provider object using the at least one proximate provider data structure.

7. The apparatus of claim 1, wherein executing the action datum comprises:
determining a relation datum as a function of a provider indicator associated with the at least one proximate provider data structure and a user indicator;
selecting at least one execution dispatcher agent from a plurality of execution dispatcher agents characterized by the plurality of provider indicators as a function of the relation datum; and
executing the action datum using the at least one execution dispatcher agent.

8. The apparatus of claim 7, wherein selecting the at least one execution dispatcher agent comprises:
training an agent selection machine learning model using execution dispatcher agent training data, wherein the execution dispatcher agent training data comprises a plurality of relation datums as input correlated to a plurality of execution dispatcher agents as output; and
selecting the at least one execution dispatcher agent as a function of the user indicator using the agent selection machine learning model.

9. The apparatus of claim 1, wherein the memory further comprises instructions configuring the at least a processor to:
display the provider landscape to the plurality of first entities using a visual interface.

10. The apparatus of claim 1, wherein identifying the plurality of proximate provider data structures further comprises determining a proximity score for each provider data structure of the plurality of provider data structures.

11. A method for integrating a plurality of proximate provider data structures in a digital environment, the method comprises:
receiving, by at least a processor, provider data from a plurality of first entities, wherein the provider data comprises a plurality of provider indicators associated with the plurality of first entities;
generating, by the at least a processor, a plurality of provider models in a digital environment, wherein generating the plurality of provider models comprises:
creating a plurality of provider data structures as a function of the provider data, wherein each provider data structure of the plurality of provider data structures is associated with at least one first entity of the plurality of first entities;
identifying a plurality of proximate provider data structures as a function of the plurality of provider indicators using a provider data structure classifier wherein at least one proximate provider data structure of the plurality of proximate provider data structures comprises a target market proximate provider data structure, wherein identifying the plurality of proximate provider data structures comprises determining a proximity score for each provider data structure of the plurality of provider data structures; and wherein the proximity score is updated in realtime as the at least a processor iterates through the plurality of provider data structures;
generating at least one provider model by integrating the plurality of proximate provider data structures; and
generating at least one subscription model, wherein the at least one subscription model is a provider model configured to allow an authorized user within the digital environment to interact with the provider model via an authentication datum;
operating, by the at least a processor, a digital communication between the at least one provider model and a user model modeled using user data from a second entity in the digital environment, wherein operating the digital communication comprises:
detecting an action datum targeting at least one proximate provider data structure of the at least one provider model as a function of the second entity; and
executing the action datum as a function of the user data; and
generating, by the at least a processor, a provider landscape as a function of the execution of the action datum.

12. The method of claim 11, wherein each provider data structure of the plurality of provider data structures comprises at least a provider object.

13. The method of claim 12, wherein executing the action datum comprises:
identifying at least a provider object from the at least one proximate provider data structure as a function of the action datum;
initializing an object transfer protocol as a function of the user data; and
executing the object transfer protocol on the at least a provider object using the at least one proximate provider data structure.

14. The method of claim 11, wherein identifying the plurality of proximate provider data structures comprises:
comparing each provider indicator of the plurality of provider indicators against a reference indicator; and
identifying the plurality of proximate provider data structures as a function of the comparison of the plurality of provider indicators and the reference indicator.

15. The method of claim 11, wherein integrating the plurality of proximate provider data structures comprises linking the plurality of proximate provider data structures to the at least one provider model.

16. The method of claim 11, wherein the user data is received through a data collection unit comprising a language processing module.

17. The method of claim 11, wherein executing the action datum comprises:

determining a relation datum as a function of a provider indicator associated with the at least one proximate provider data structure and a user indicator;

selecting at least one execution dispatcher agent from a plurality of execution dispatcher agents characterized by the plurality of provider indicators as a function of the relation datum; and executing the action datum using the at least one execution dispatcher agent.

18. The method of claim 17, wherein selecting the at least one execution dispatcher agent comprises:

training an agent selection machine learning model using execution dispatcher agent training data, wherein the execution dispatcher agent training data comprises a plurality of relation datums as input correlated to a plurality of execution dispatcher agents as output; and selecting the at least one execution dispatcher agent as a function of the user indicator using the agent selection machine learning model.

19. The method of claim 11, wherein the method further comprises a step of: displaying, using a visual interface, the provider landscape to the plurality of first entities.

20. The method of claim 11, wherein identifying the plurality of proximate provider data structures further comprises determining a proximity score for each provider data structure of the plurality of provider data structures.

* * * * *